(12) United States Patent
Reeves-Hall et al.

(10) Patent No.: US 11,588,292 B2
(45) Date of Patent: Feb. 21, 2023

(54) PHOTONIC LANTERN STRUCTURES AND DEVICES

(71) Applicant: Massachusetts Institute of Technology, Cambridge, MA (US)

(72) Inventors: Peter Reeves-Hall, Northbridge, MA (US); Juan C. Montoya, Belmont, MA (US); Dale H. Martz, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 567 days.

(21) Appl. No.: 16/561,580

(22) Filed: Sep. 5, 2019

(65) Prior Publication Data

US 2020/0083659 A1 Mar. 12, 2020

Related U.S. Application Data

(60) Provisional application No. 62/728,506, filed on Sep. 7, 2018.

(51) Int. Cl.
| | |
|---|---|
| *H01S 3/067* | (2006.01) |
| *H01S 3/13* | (2006.01) |
| *H01S 3/131* | (2006.01) |
| *H01S 3/091* | (2006.01) |
| *G02B 6/28* | (2006.01) |

(52) U.S. Cl.
CPC ........ *H01S 3/06787* (2013.01); *G02B 6/2813* (2013.01); *H01S 3/091* (2013.01);
(Continued)

(58) Field of Classification Search
None
See application file for complete search history.

(56) References Cited

U.S. PATENT DOCUMENTS

| | | |
|---|---|---|
| 7,386,203 B2 | 6/2008 | Maitland et al. |
| 8,693,824 B2 | 4/2014 | Hu |
| (Continued) | | |

FOREIGN PATENT DOCUMENTS

| | | | |
|---|---|---|---|
| JP | 2017034064 A | 2/2017 | |
| WO | 2013090549 A2 | 6/2013 | |
| WO | WO-2017171961 A2 * | 10/2017 | ............ G02F 1/0115 |

OTHER PUBLICATIONS

Birks et al. "The Photonic lantern" Advances in Optics and Photonics, vol. 7, issue 2, pp. 107-167. (Year: 2015).*

(Continued)

*Primary Examiner* — Eric L Bolda
(74) *Attorney, Agent, or Firm* — Smith Baluch LLP

(57) ABSTRACT

A photonic lantern couples light from several fibers or fiber cores into one or more fibers or fiber cores. Photonic lanterns are often used to combine several lower-power beams into a single higher-power beam. They can also be used to couple light from multi-core fibers into single-mode, multi-mode, or other multi-core fibers. By modulating the phases of the input beams, the light can be switched from output to output—for example, between output cores of a multi-core output fiber. If desired, the beams can also be amplified using an active fiber in or coupled to the photonic lantern. A first photonic lantern couples signal light and pump light into the core and cladding, respectively, of an active multi-mode or multi-core fiber. And the active multi-mode or multi-core fiber couples amplified signal light into output fiber(s) via a second photonic lantern.

19 Claims, 33 Drawing Sheets

(52) U.S. Cl.
CPC .......... H01S 3/1305 (2013.01); H01S 3/1312 (2013.01); *G02B 6/2843* (2013.01)

(56) References Cited

U.S. PATENT DOCUMENTS

| | | |
|---|---|---|
| 8,903,211 B2 | 12/2014 | Fini et al. |
| 9,025,239 B2 | 5/2015 | Zhu |
| 2006/0204190 A1 | 9/2006 | Ranka |
| 2007/0201793 A1 | 8/2007 | Askins et al. |
| 2011/0032602 A1* | 2/2011 | Rothenberg ....... G02B 6/02042 359/341.1 |
| 2012/0219255 A1 | 8/2012 | Bradley et al. |
| 2017/0299900 A1* | 10/2017 | Montoya ............... G02F 1/0115 |
| 2019/0212761 A1* | 7/2019 | Swanson .................. A61B 1/07 |

OTHER PUBLICATIONS

Abedin et al. "Seven-core erbium-doped double-clad fiber amplifier pumped simultaneously by side-coupled multimode fiber." Optics Letters 39.4 (2014): 993-996.
Hansen et al., "Thermally induced mode coupling in rare-earth doped fiber amplifiers." Optics Letters 37.12 (2012): 2382-2384.
Kaminow, "Polarization in optical fibers," IEEE Journal of Quantum Electronics, 17(1):15-22, Jan. 1981.
Ward et al., "Origin of thermal modal instabilities in large mode area fiber amplifiers." Optics Express 20.10 (2012): 11407-11422.
International Search Report and Written Opinion in International Application No. PCT/US2019/049821 dated Dec. 2, 2019, 9 pages.

* cited by examiner

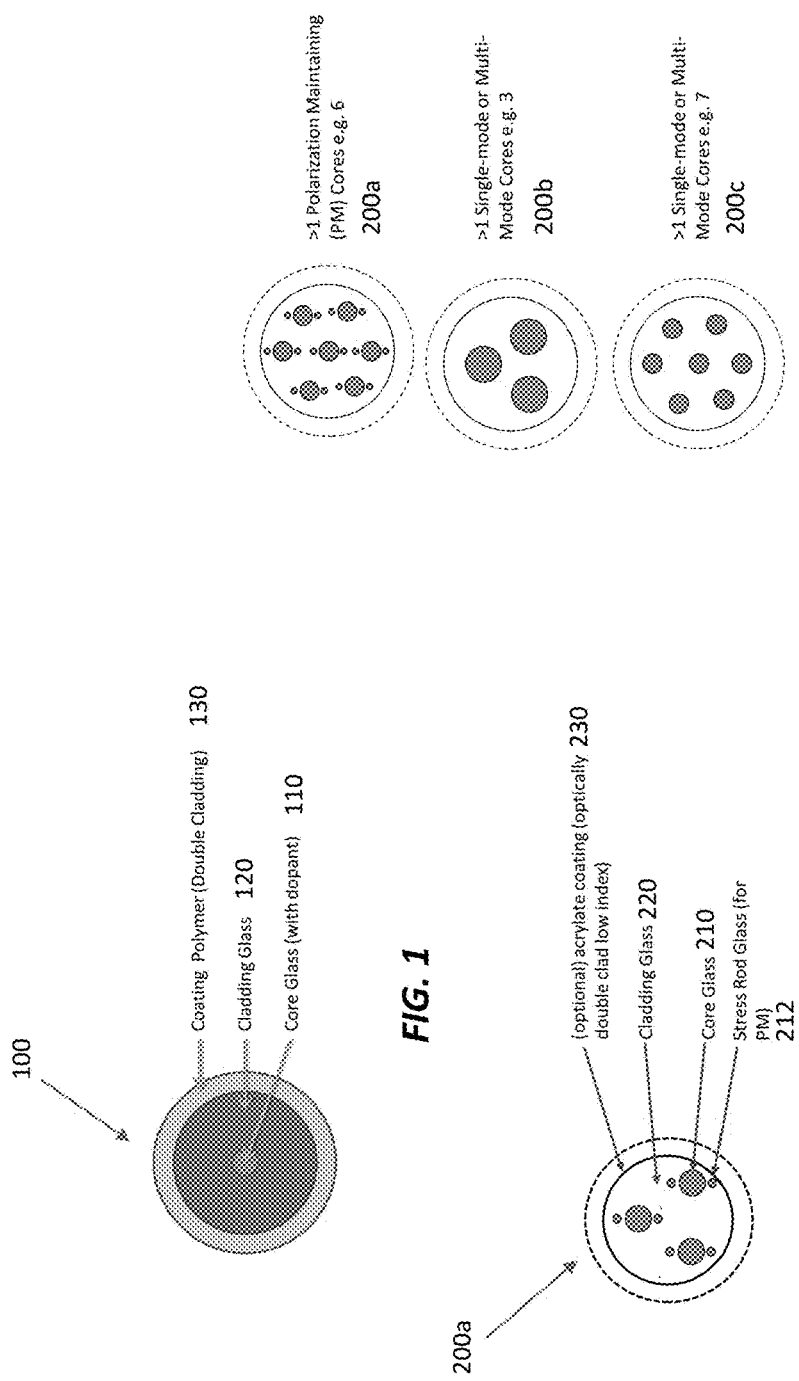

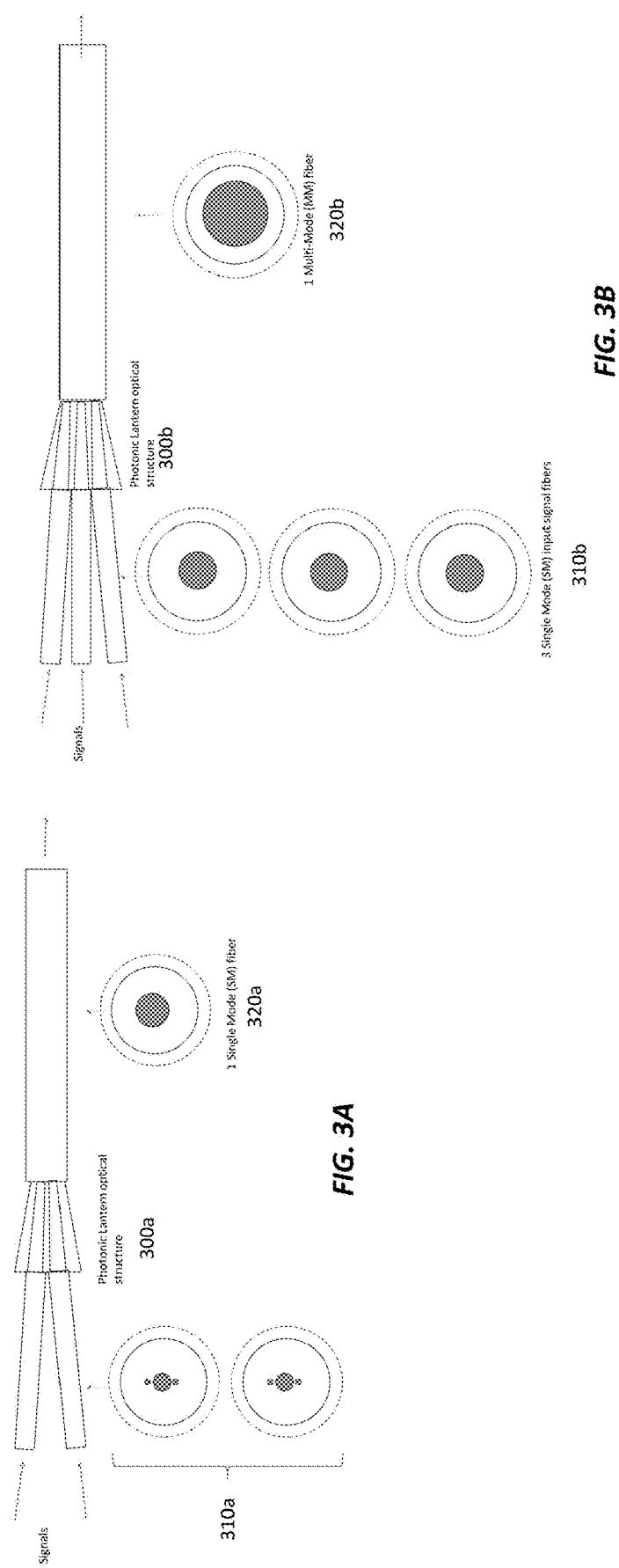

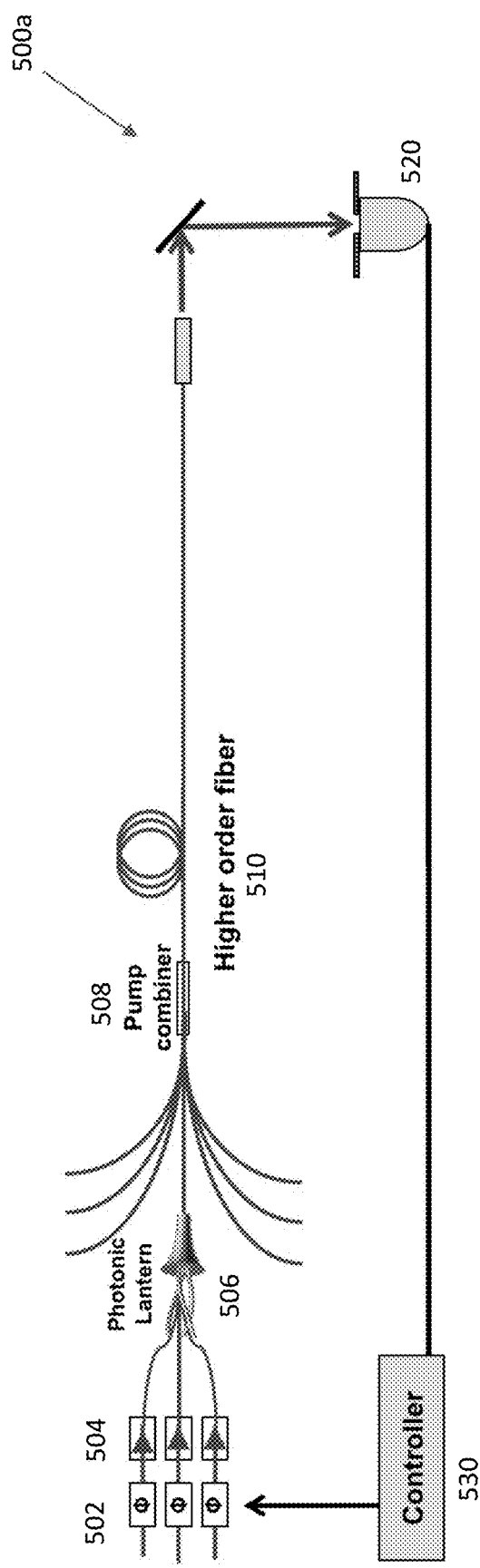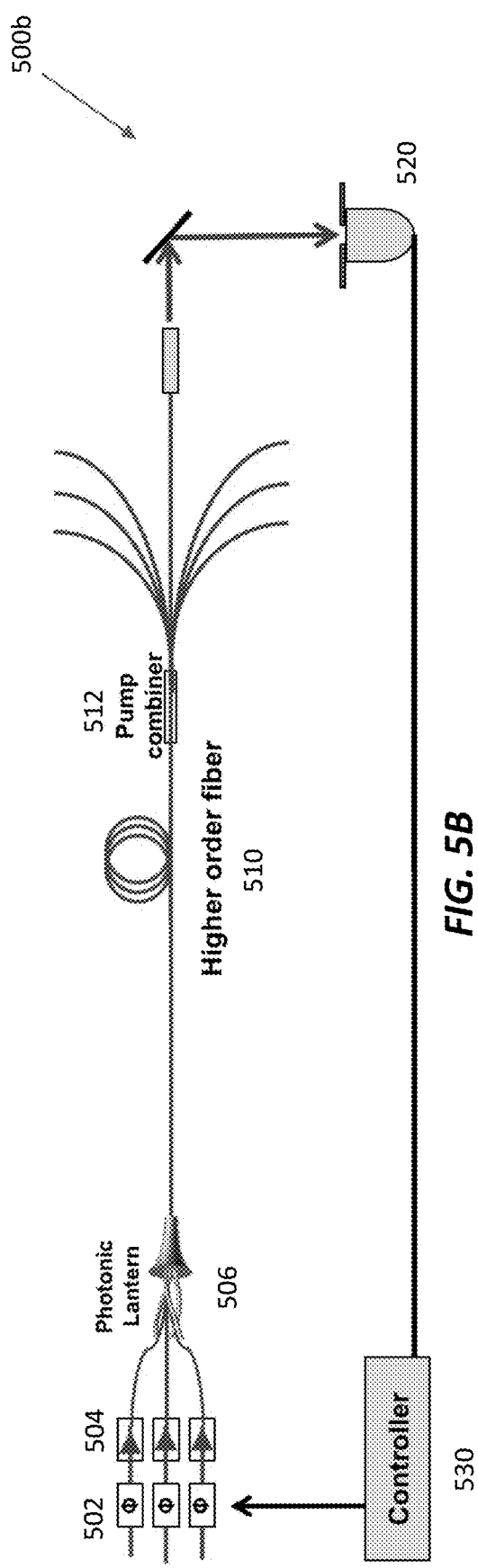
FIG. 5A
FIG. 5B

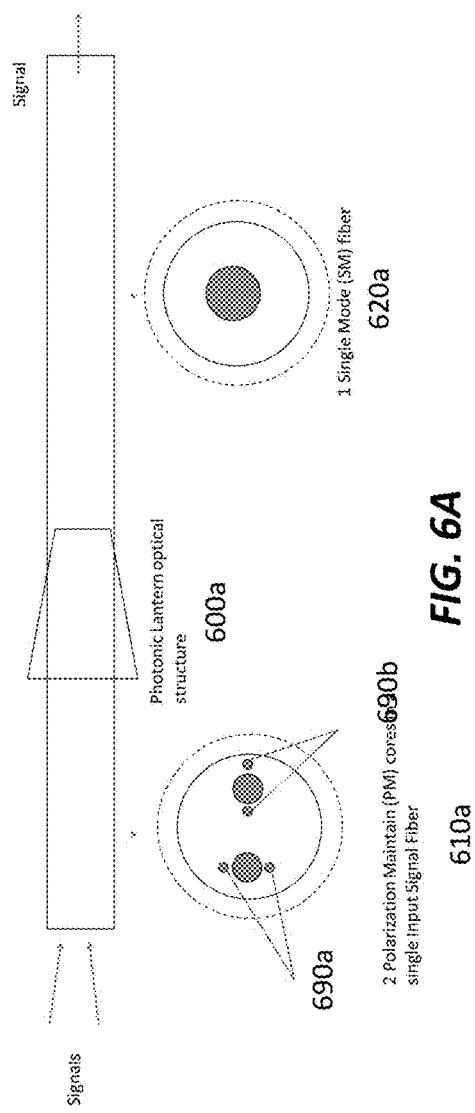
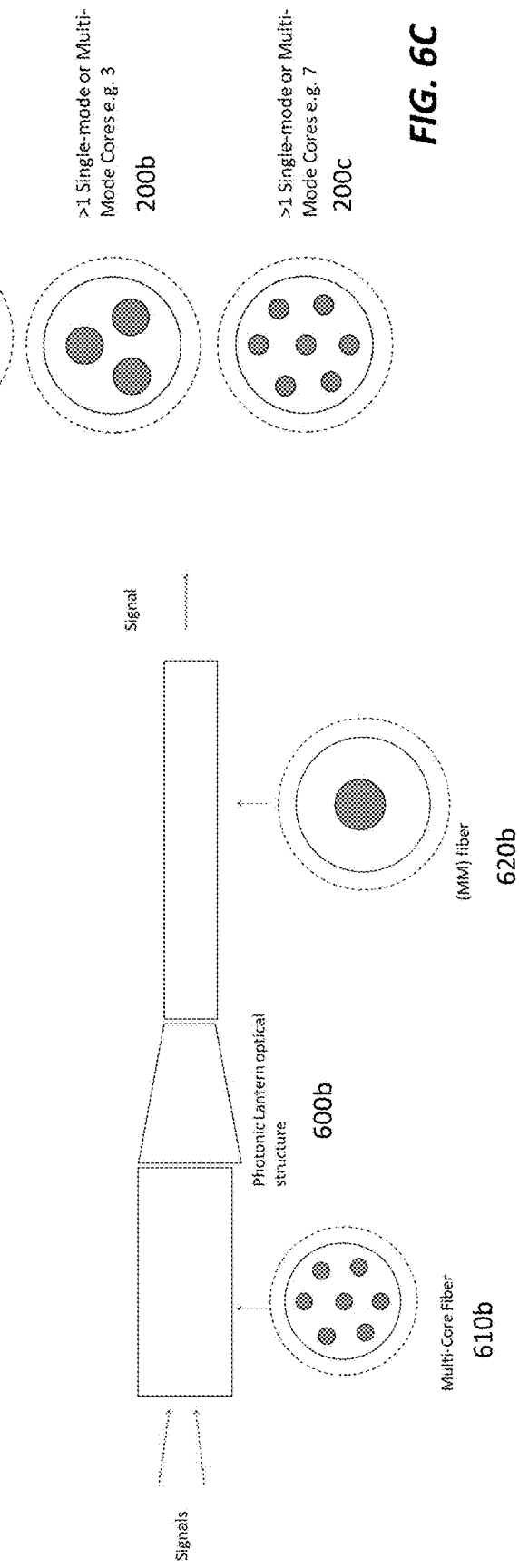
FIG. 6A
FIG. 6B
FIG. 6C

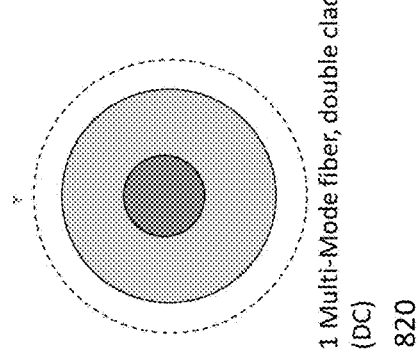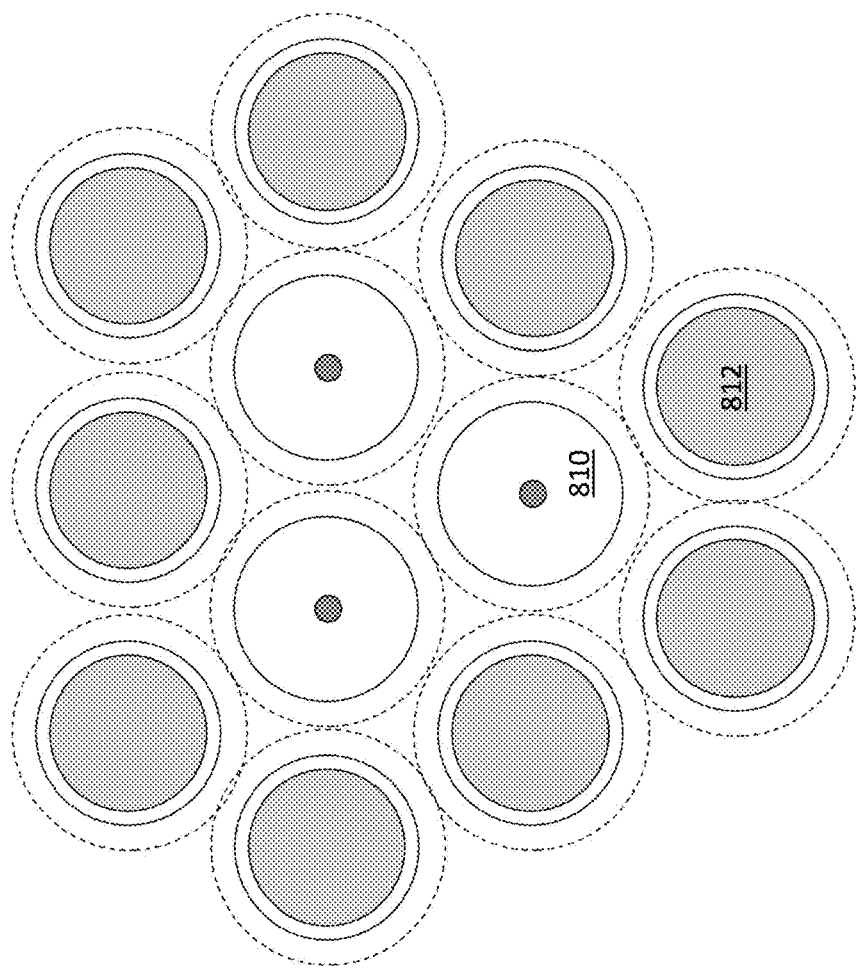
FIG. 8B

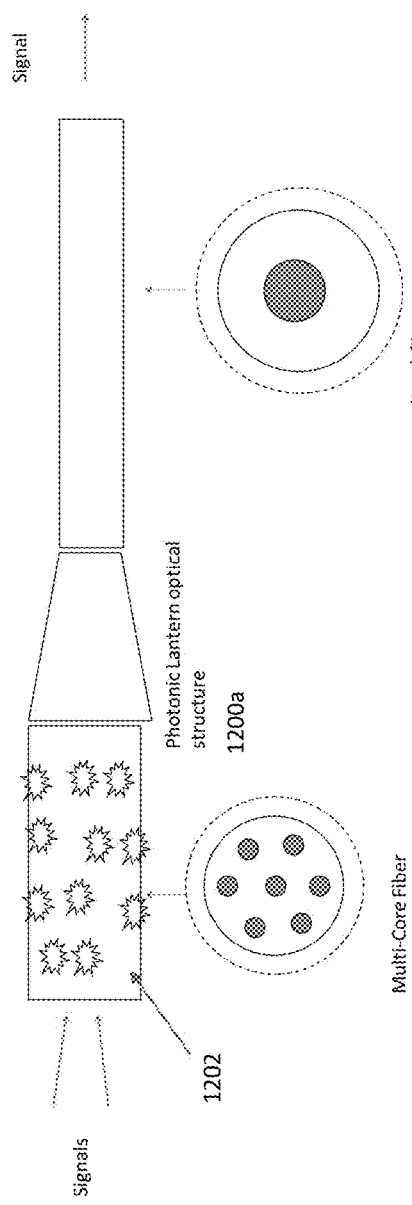
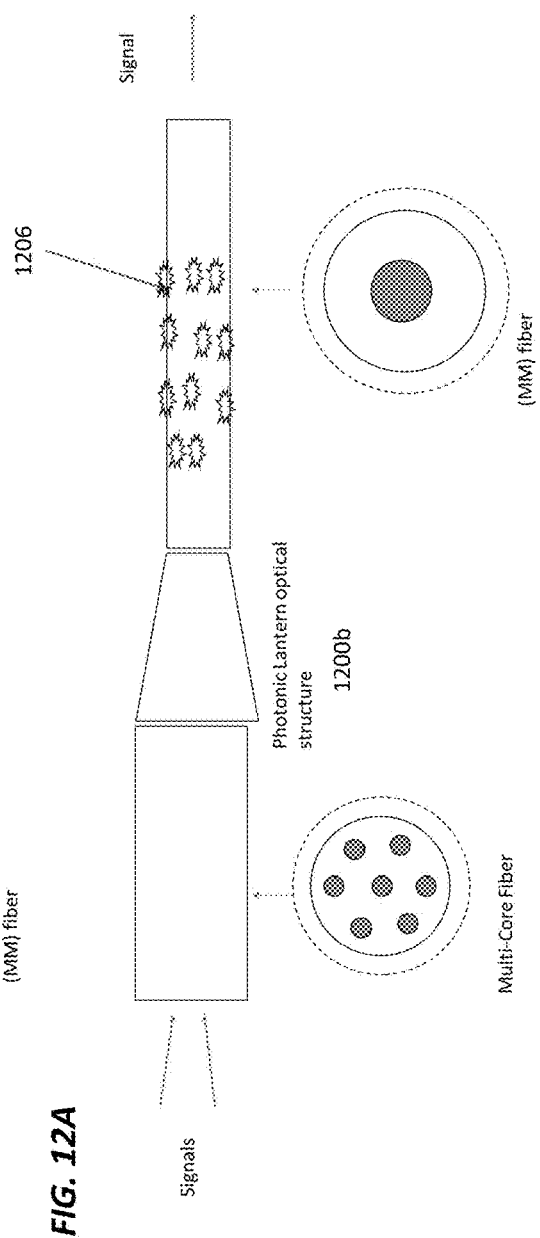
FIG. 12A
FIG. 12B

PHOTONIC LANTERN STRUCTURES AND DEVICES

CROSS-REFERENCE TO RELATED APPLICATION(S)

This application claims the priority benefit, under 35 U.S.C. § 119(e), of U.S. Application No. 62/728,506, filed on Sep. 7, 2018, which is incorporated herein by reference in its entirety.

GOVERNMENT SUPPORT

This invention was made with Government support under Grant No. FA8702-15-D-0001 awarded by the U.S. Air Force. The Government has certain rights in the invention.

BACKGROUND

FIG. 1A shows a double-clad, doped (active) optical fiber 100. It includes a doped core 110 surrounded by a glass inner cladding 120, which in turn is surrounded by a polymer outer cladding 130. The doped core 110 has the highest index of refraction, followed by the inner cladding 120, then the outer cladding 130. The core 110 guides and amplifies light at a signal wavelength, and the inner cladding 120 guides pump light at a shorter pump wavelength. As the pump light propagates along the fiber 100, it crosses the core 110, where the dopant absorbs the pump light and amplifies the signal light.

These double-clad, doped optical fibers have been key to the development of high-power fiber lasers and amplifiers. They allow coupling of multiple kilowatts of low-brightness pump light into the cladding glass for pumping laser dopants and signal confined to the fiber core region. In the case of ytterbium-doped fiber lasers the pump wavelength is typically 910-980 nm and the signal (emission) wavelength is typically 1020-1090 nm. Other dopants with their own corresponding pump and emission wavelengths also exist (e.g., thulium, erbium, etc.).

The laser process and associated quantum defect, together with absorption of pump and signal light that is greater than the absorption of passive (undoped) fiber, cause significant heating of the doped fiber in multi-kilowatt fiber lasers and amplifiers.

FIGS. 2A-2D show different multi-core optical fibers 200a-200d (collectively, multi-core fibers 200), which are recent variants of the more traditional single-core (waveguide) fiber shown in FIG. 1. Each multi-core fiber 200 has multiple (doped) cores 210 embedded in a glass inner cladding 220 and an optional acrylate coating 239. The cores and inner cladding have parallel longitudinal axes. The polarization-maintaining (PM) multi-core fibers 200a and 200b also have glass stress rods 212 in the inner cladding with longitudinal axes parallel to the longitudinal axes of the cores 210.

The optical fibers shown in FIGS. 1 and 2A-2D are used in fiber lasers and amplifiers for industrial laser processing equipment. Fiber laser machines cover many applications of material processing, including but not limited to high-speed thin metal (or other material) cutting, thick metal cutting, welding, brazing. surface treatments (e.g., hardening, cleaning, etc.), micro-machining, hole drilling, 3D printing and sintering, and medical applications (e.g., laser surgery). Many of these applications of high-power fiber lasers require laser beams with a beam quality factor $M^2$ approaching 1.0. The beam quality factor, also called the beam propagation factor, is defined as the product of the beam radius, the beam divergence half-angle, and $\pi$ divided by the beam wavelength. A diffraction-limited beam has a beam quality factor of $M^2=1$.

Achieving very high beam quality factors with fiber lasers can be challenging. Many of the challenges involve scaling the power in an optical fiber that guides a single mode or a few modes and filtering the output to ensure (near) single-mode operation. Scaling the power past about 1 kW with a single-mode fiber laser or amplifier becomes increasing difficult due to unwanted optical non-linearity in the fiber such as stimulated-Brillion-scattering (SBS). The general solution is to use a large mode area (LMA) fiber, but an LMA fiber allows some higher-order modes and the onset of multi-mode instability (MMI), which is also known as transverse-mode instability (TMI). MMI is a thermo-optical effect which is couples light out of the core LP01 mode to higher-order modes, degrading the beam quality factor. This degradation in beam quality causes material processing problems, such as a wider affected heat zone, poor quality cutting edge, reduced cutting speed, inability to machine to small feature sizes on the material, etc.

FIGS. 3A and 3B show optical fiber photonic lanterns 300a and 300b, respectively, for combining beams in different optical fibers into a single, higher-power beam. The photonic lantern 300a in FIG. 3A combines multiple SM, PM input fibers 310a with one transverse spatial mode per input fiber on the input side into a single SM output fiber 320a that supports orthogonal polarizations of a fundamental transverse spatial mode. Ideally, the number of input modes is equal to the number of output modes—in this case, two input modes (one per input fiber) and two output modes (one per polarization). By controlling the relative phase(s) of the input signals, a specific output mode and polarization or superposition/combination of output modes and polarizations can be selected.

A photonic lantern can have more than two input PM fibers and an output fiber that supports more than just two modes. For example, the output fiber could be a MM output fiber that supports the first three fundamental modes (each with two polarizations), totaling six modes or degrees of freedom, from six PM input fibers. Likewise, a cascaded photonic lantern can have input fibers that guides more than one spatial mode and/or polarization each and an output fiber that guides all of the spatial modes and polarizations from the input fibers. For example, the photon lantern 300b in FIG. 3B combines beams from three SM input fibers 310b into a single MM output fiber 320b. If each input fiber 310b supports two orthogonal polarizations (e.g., as outputs from the photonic lantern 300a in FIG. 3A), then up to six modes could propagate through the single MM output fiber 320b.

SUMMARY

Inventive photonic lantern systems can use under-provisioning to reduce control complexity and over-provisioning to compensate for real life manufacturing tolerances and fabrication and implementation imperfections. Some inventive photonic lantern systems offer a hierarchy of mode control via multi-core fibers, with one or more multi-core fibers coupled to single-core fibers and multi-core fibers with fewer cores. Light can be switched or distributed among an inventive photonic lantern's output modes (e.g., different modes in the same core, different cores in the same fibers, and/or different cores in different fibers) by adjusting the phase(s) and amplitude(s) of the input beam(s).

An example photonic lantern system may support pump power delivery through one or more auxiliary pump fibers. Such a photonic lantern system may amplify the signal beam in an active fiber (e.g., a fiber doped with rare earth ions) pumped by the pump beam(s). Active and passive photonic lantern systems may incorporate cladding light stripping/removal elements to remove any residual pump light that may be detrimental to downstream components.

For instance, an inventive photonic lantern system may include at least one multi-core optical fiber, at least one optical fiber (e.g., a large-mode-area, multi-mode optical fiber), and a photonic lantern optically connecting the at least one multi-core optical fiber to the at least one optical fiber. The multi-core optical fiber may have a plurality of polarization-maintaining (PM) cores.

In some cases, the at least one multi-core optical fiber comprises a first multi-core fiber and the at least one optical fiber comprises a second multi-core optical fiber. In these cases, the first multi-core optical fiber can comprise N cores and the second multi-core optical fiber can comprise M<N cores, where M and N are positive integers. Each of the M<N cores in the second-multi-core optical fiber can be a multi-mode core. Alternatively, the second multi-core optical fiber can comprise M>N cores.

In a system with first and second multi-core fibers, the photonic lantern may be a first photonic lantern coupled to the first multi-core fiber, in which case the system may also include a second photonic lantern coupled to the second multi-core fiber and an intermediate optical fiber connecting the first photonic lantern to the second photonic lantern. This intermediate optical fiber can be doped with a gain medium. It may be a multi-mode optical fiber or a third multi-core optical fiber. It can also have a cladding configured to guide a pump beam.

A photonic lantern system may also include at least one pump fiber, evanescently coupled to the at least one multi-core fiber, to guide a pump beam amplifying a signal beam propagating in the at least one multi-core fiber. In this case, the at least one optical fiber can have a cladding configured to guide the pump beam. The multi-core optical fiber, optical fiber, and/or photonic lantern may have a cladding mode stripper, such as a surface configured to scatter light or a high-index material that at least partially surrounds or embeds the multi-core optical fiber, optical fiber, and/or photonic lantern.

A photonic lantern system with active mode control may include a multi-core input fiber, a multi-core output fiber, at least one photonic lantern optically connecting the multi-core input fiber to the multi-core output fiber, a detector in optical communication with the multi-core output fiber, a controller operably coupled to the detector, and a phase modulator in optical communication with the first input core. In operation, the photonic lantern couples a first beam from a first input core into the multi-core input fiber to a first output core in the multi-core output fiber. The detector senses light emitted by the first output core. The controller determines a phase adjustment to the first beam. This phase adjustment causes the photonic lantern to couple the first input beam from the first input core to a second multi-core output fiber. And the phase modulator imparts the phase adjustment to the first input beam.

The multi-core input fiber and the multi-core output fiber may each have N cores, where N is a positive integer. In such a case, the photonic lantern can have a multi-mode region configured to support M≥N modes, where M is a positive integer. Alternatively, the photonic lantern may have at least M≥N evanescently coupled cores, where again M is a positive integer.

In some cases, the photonic lantern is a first photonic lantern and the system includes a second photonic lantern. In these cases, an active fiber may connect the first photonic lantern to the second photonic lantern. And at least one input pump fiber, in optical communication with the active multi-mode fiber via the first photonic lantern, can couple a pump beam into an inner cladding of the active fiber.

Yet another photonic lantern system includes a multi-core optical fiber, a pump optical fiber, a double-clad active optical fiber, and a photonic lantern optically connecting the multi-core optical fiber and the pump optical fiber to the double-clad active optical fiber. In operation, the multi-core optical fiber guides signal light into the core of the double-clad active optical fiber via the photonic lantern. Similarly, the pump optical fiber guides pump light into the inner cladding of the double-clad active optical fiber. The inner cladding guides the pump light, which propagates through a core, which is doped with a gain medium to amplify the signal light.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1 shows a double-clad optical fiber with a doped core for amplifying a signal beam.

FIGS. 2A-2D show different multi-core fibers.

FIG. 3A shows a photonic lantern with single-mode (SM) inputs and an SM output.

FIG. 3B shows a photonic lantern with SM inputs and a multi-mode (MM) output.

FIGS. 5A-5C show photonic lanterns different pump configurations and in feedback loops for controlling the spatial mode(s) at the outputs.

FIGS. 6A-6C illustrate photonic lanterns with multi-core input fibers.

Figure 8A:
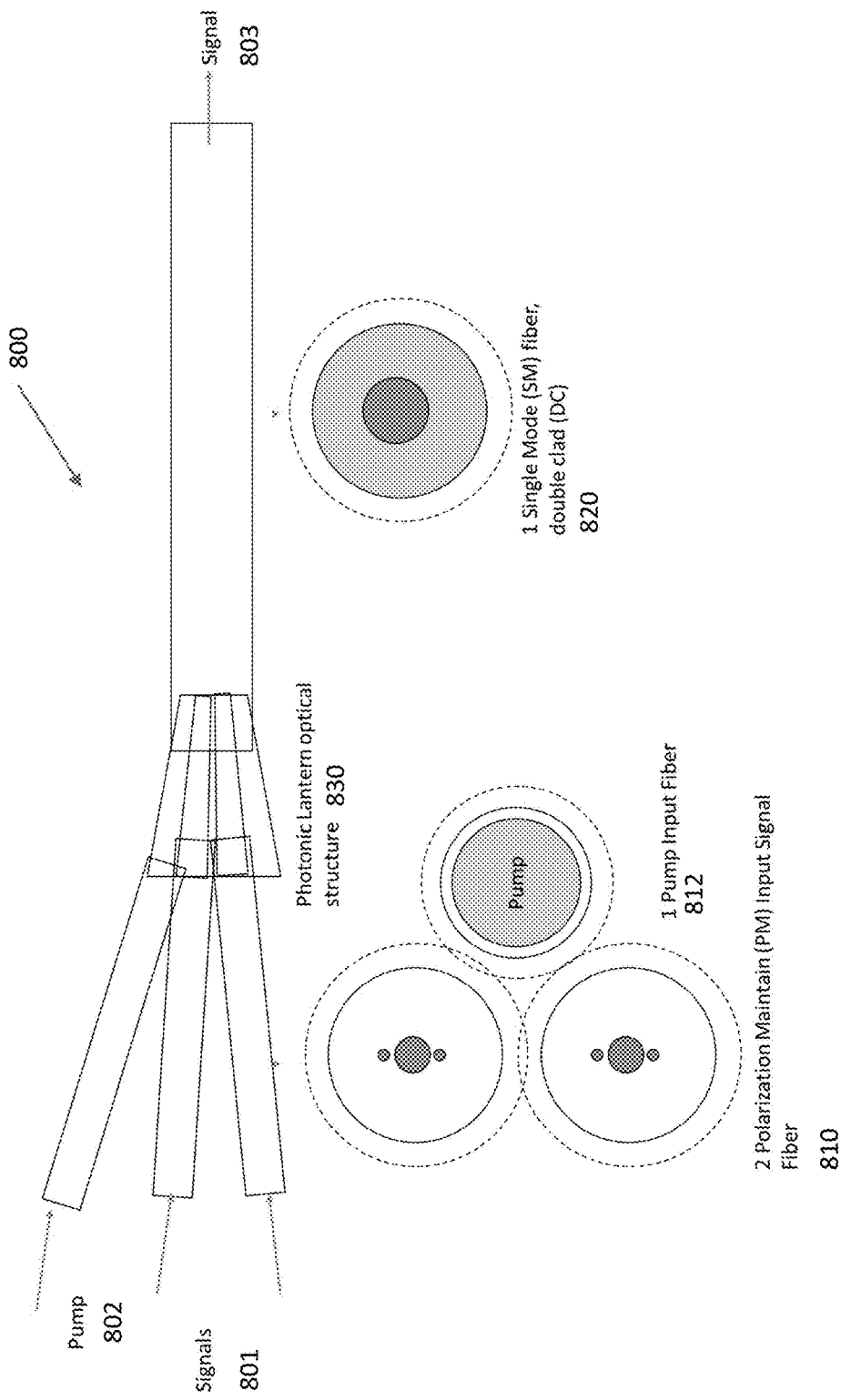
FIG. 8A shows a photonic lantern with polarization-maintaining (PM) input fibers, a pump input fiber, and a double-clad SM output fiber.
Figure 9A:
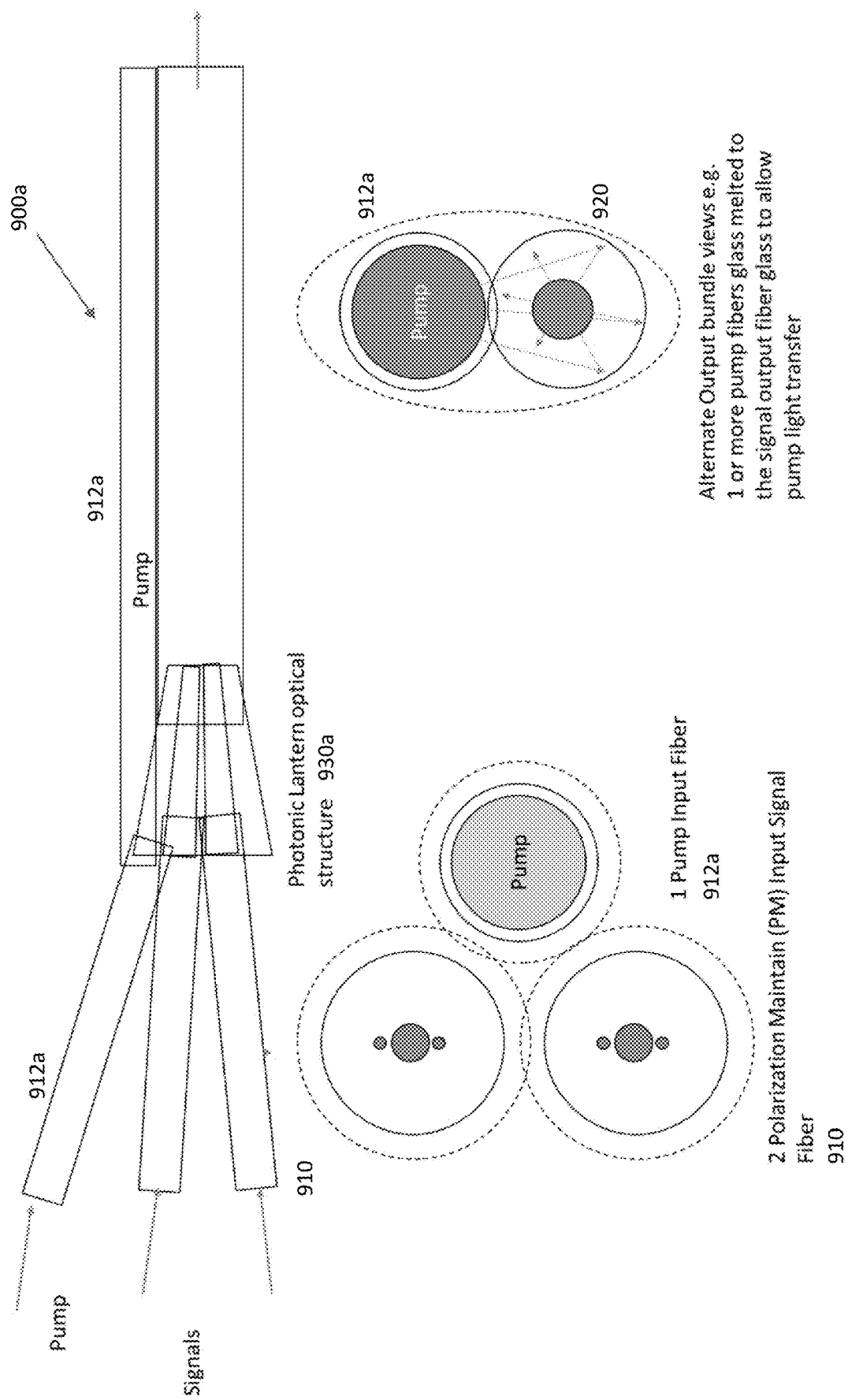

FIG. 8B alternative arrangements of input fibers for the photonic lantern of FIG. 9A.

Figure 9B:
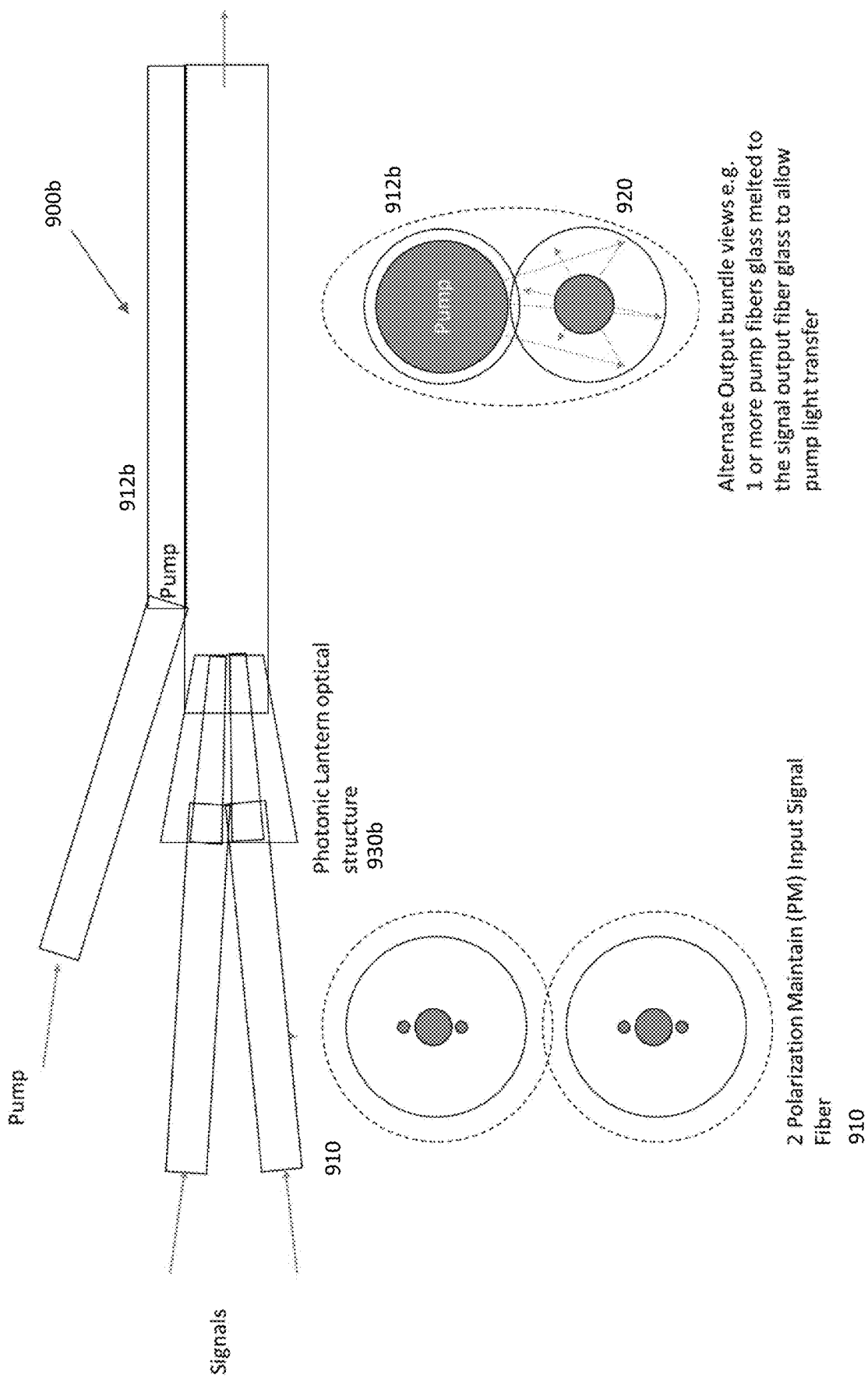
Figure 9C:
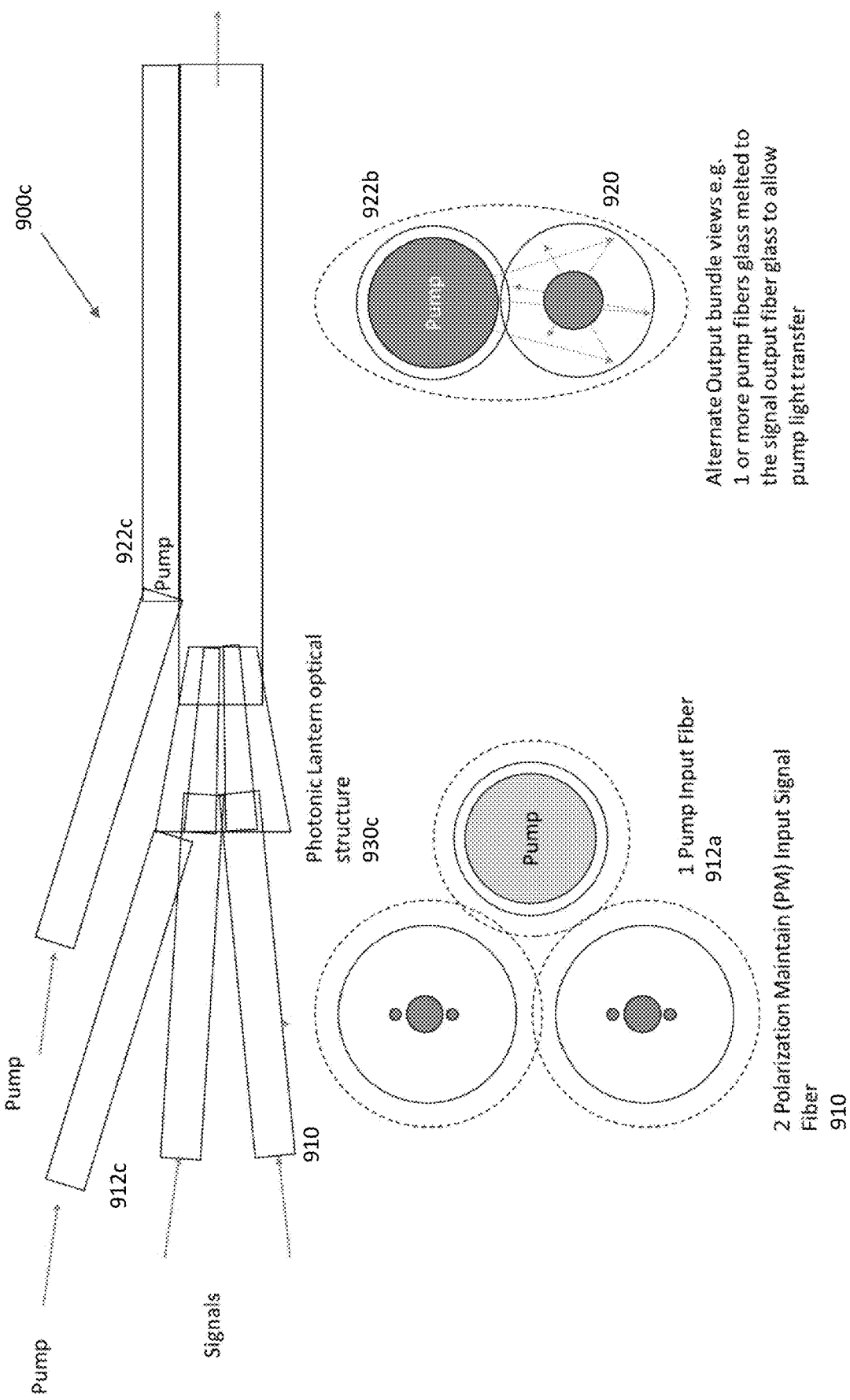

FIGS. 9A-9C show photonic lanterns with different pump fiber arrangements.

Figure 10B:
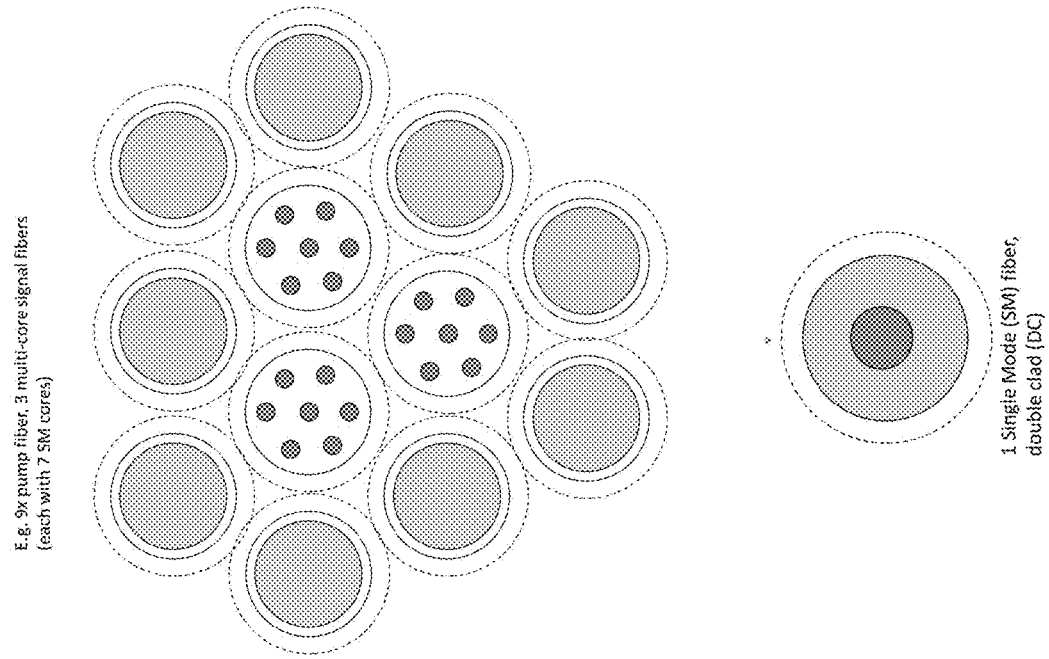
Figure 10A:
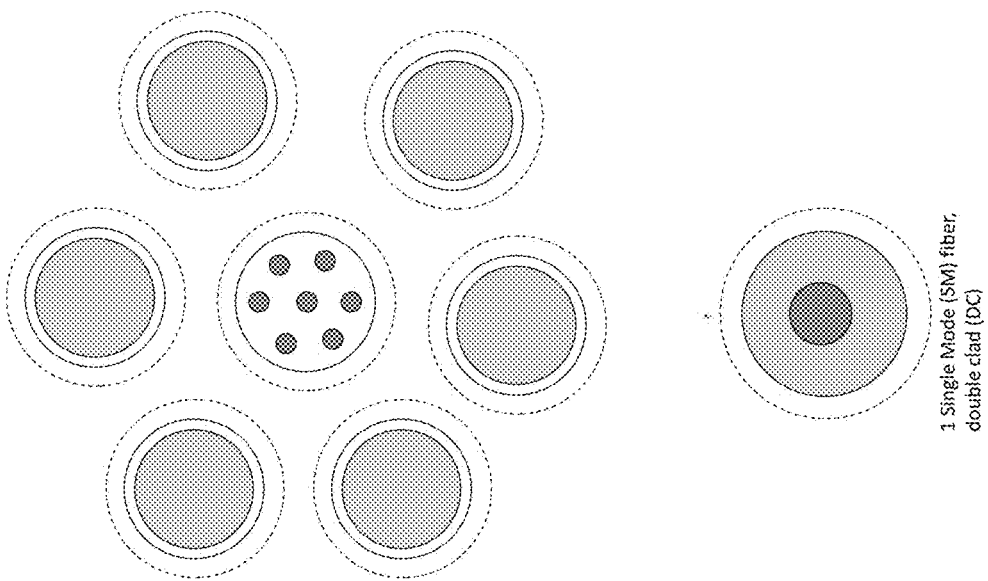
Figure 10C:
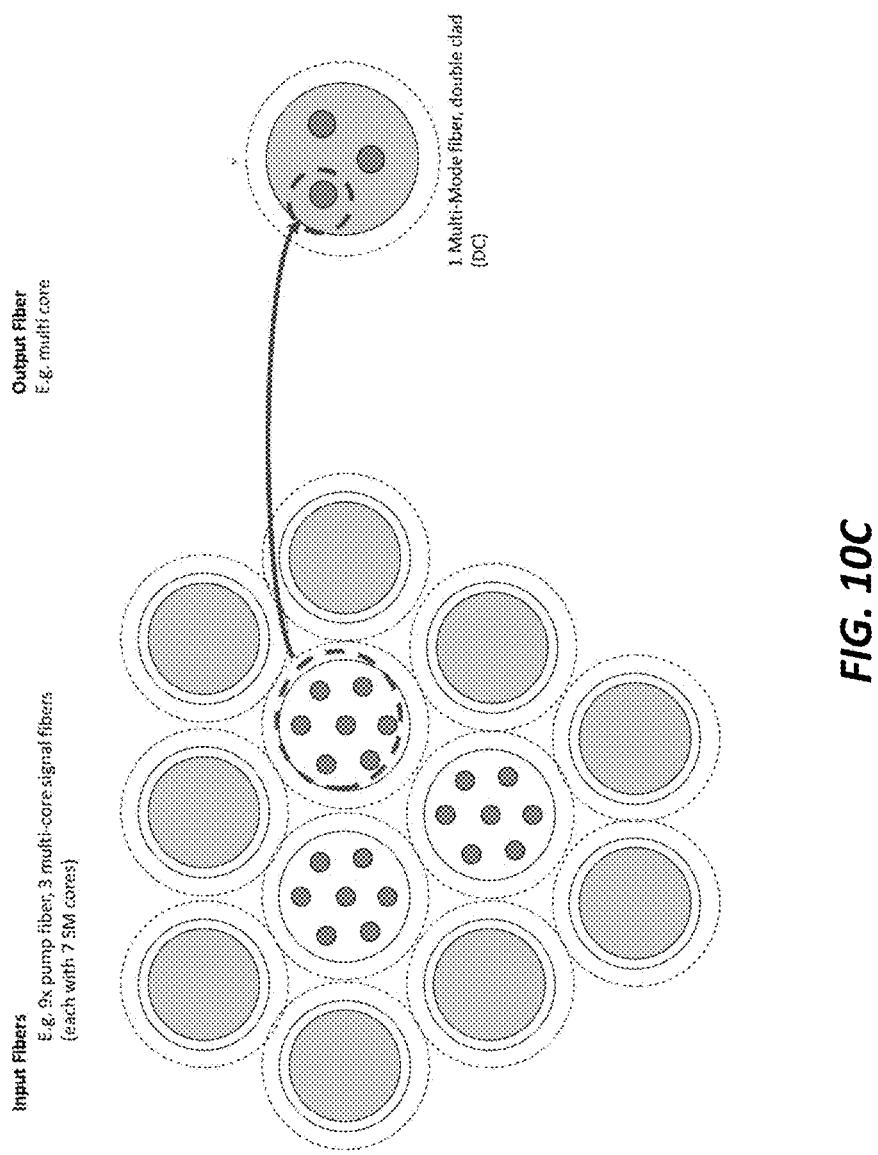

FIGS. 10A-10C show alternative arrangements of pump fibers and multi-core input fibers for photonic lanterns.

Figure 11:
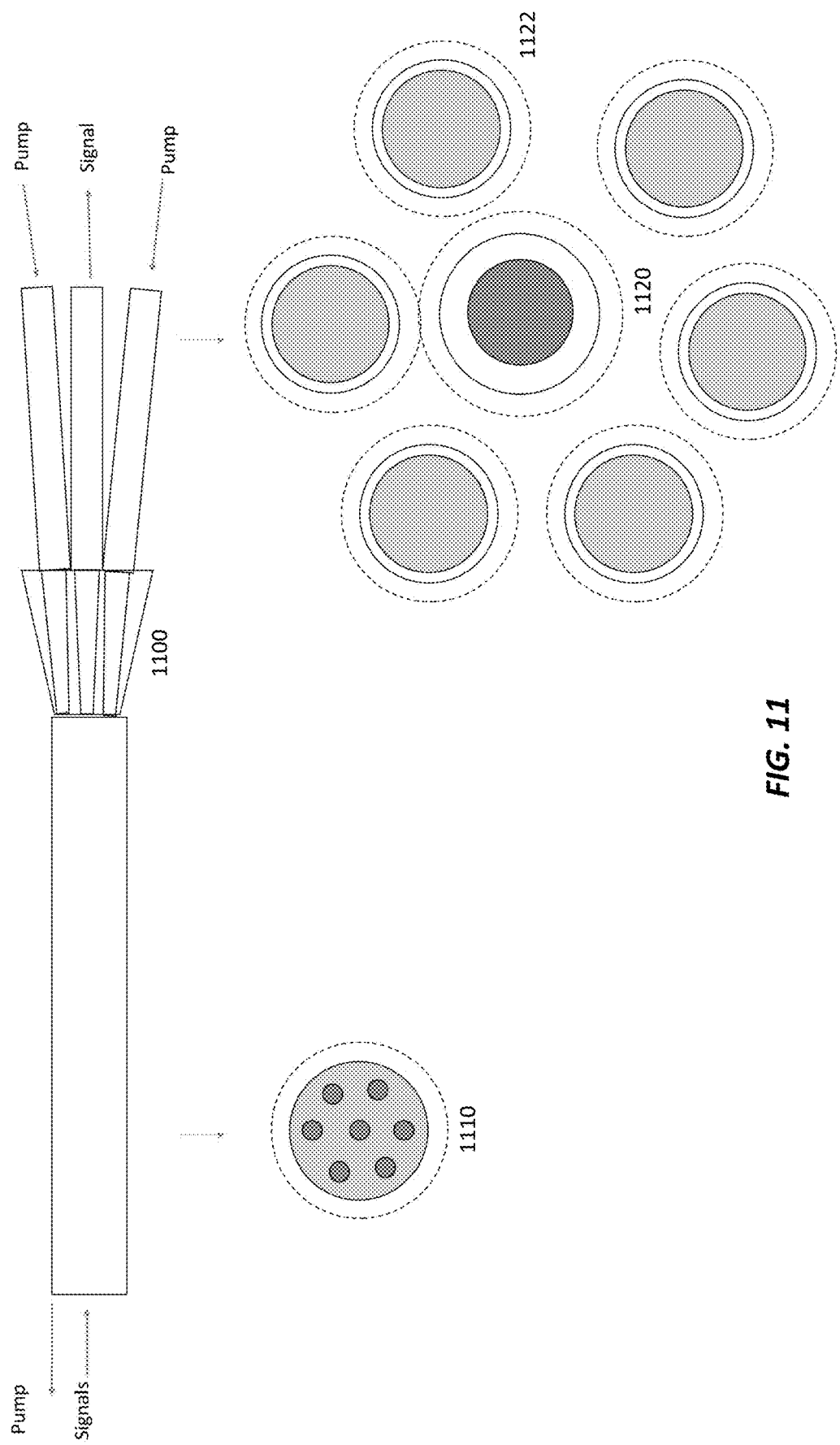
Figures 12C, 12D:
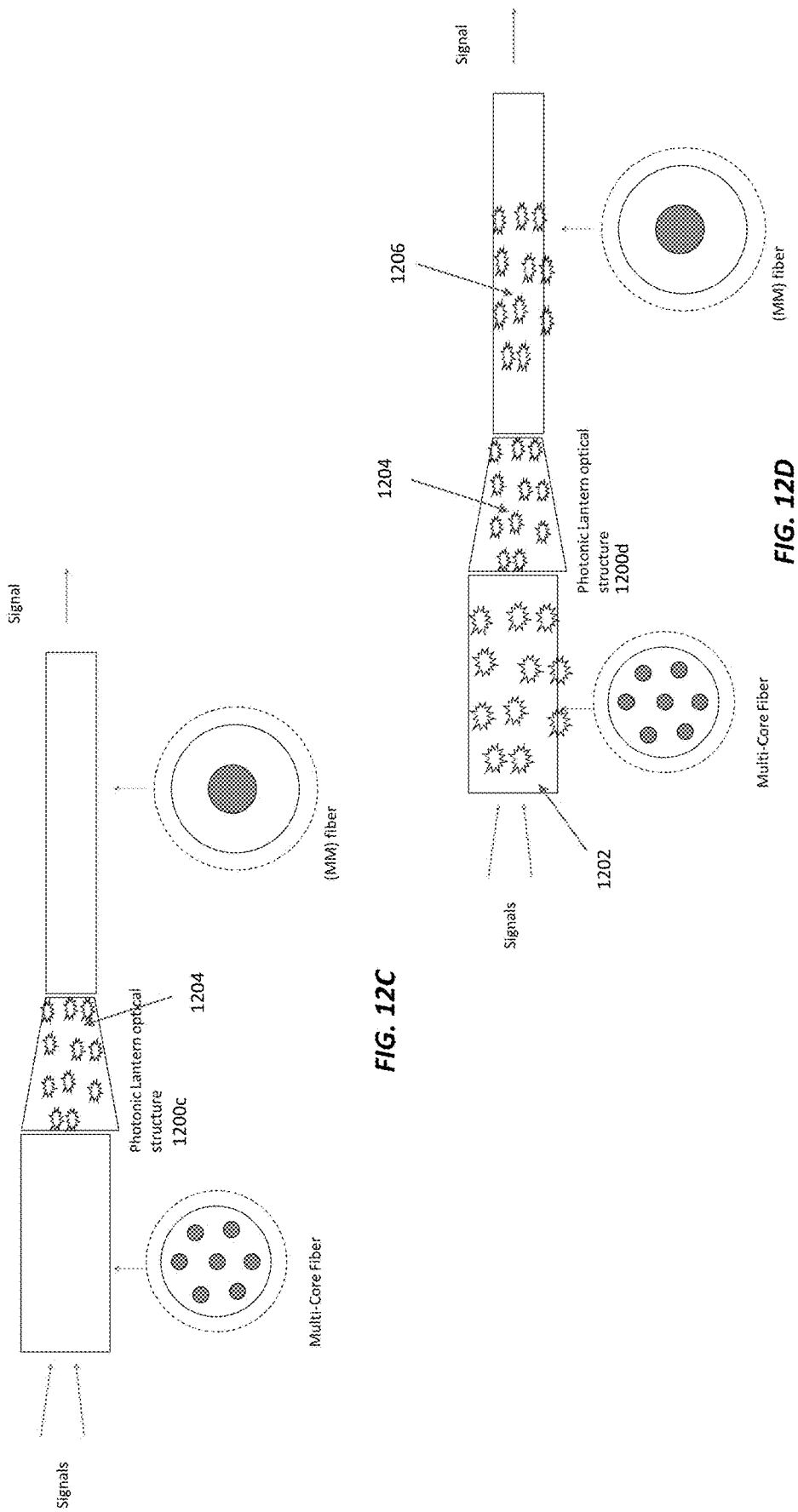
Figure 12E:
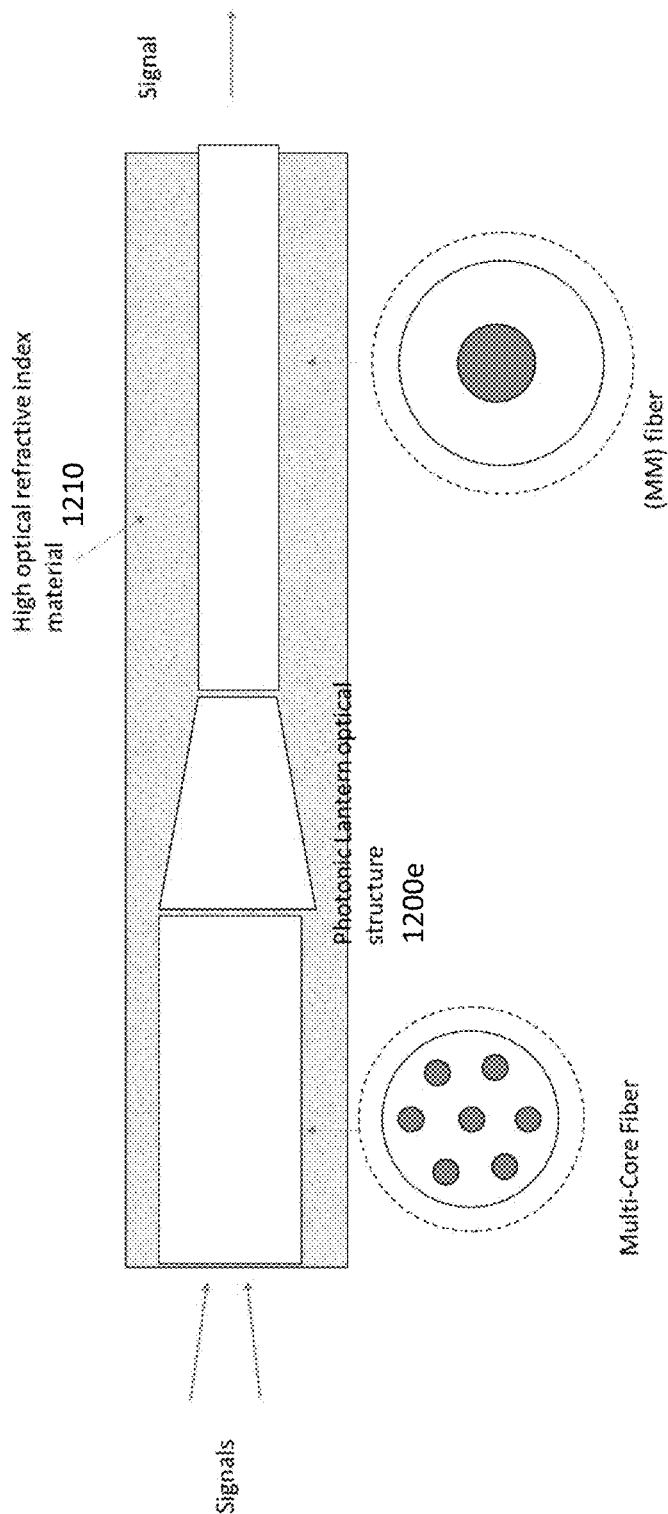

FIG. 11 shows a photonic lantern with a double-clad, multi-core input fiber.

FIGS. 12A-12E show photonic lanterns with different cladding mode strippers.

Figure 13A:
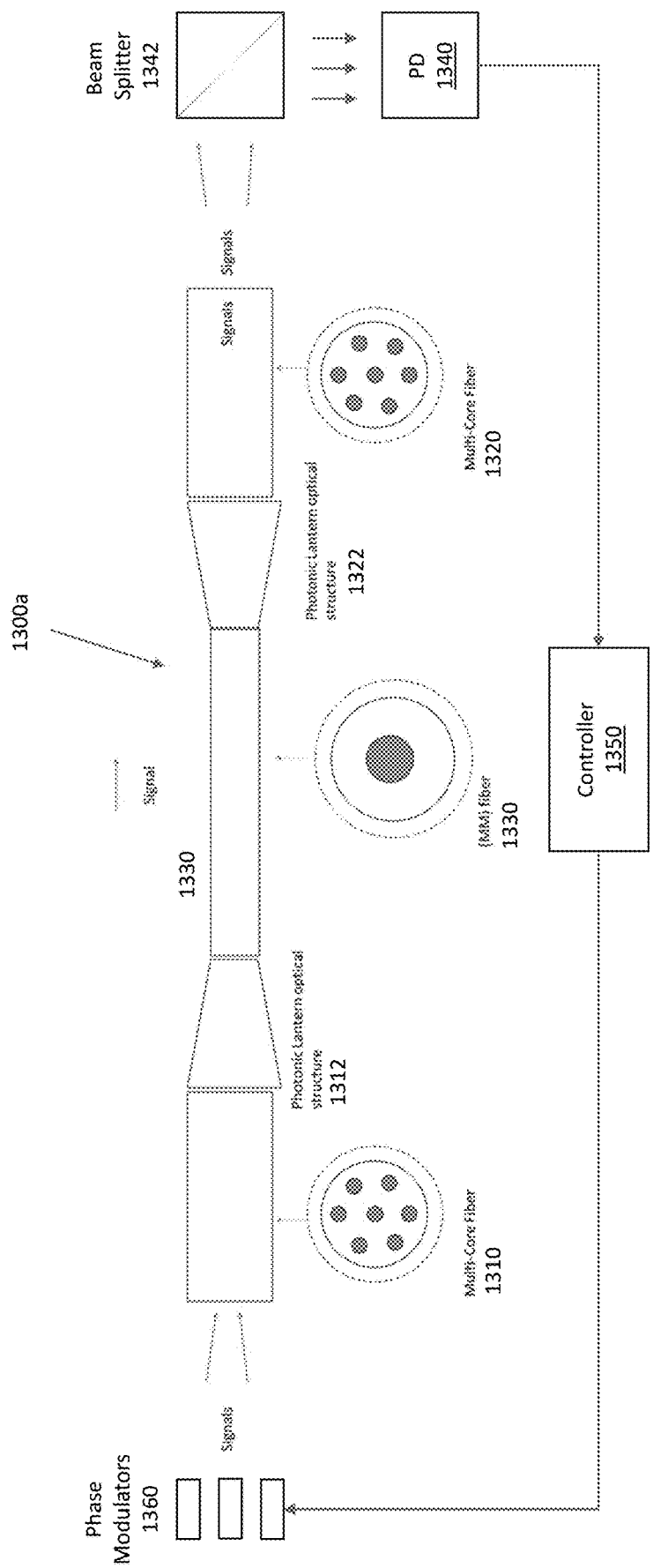
Figure 13B:
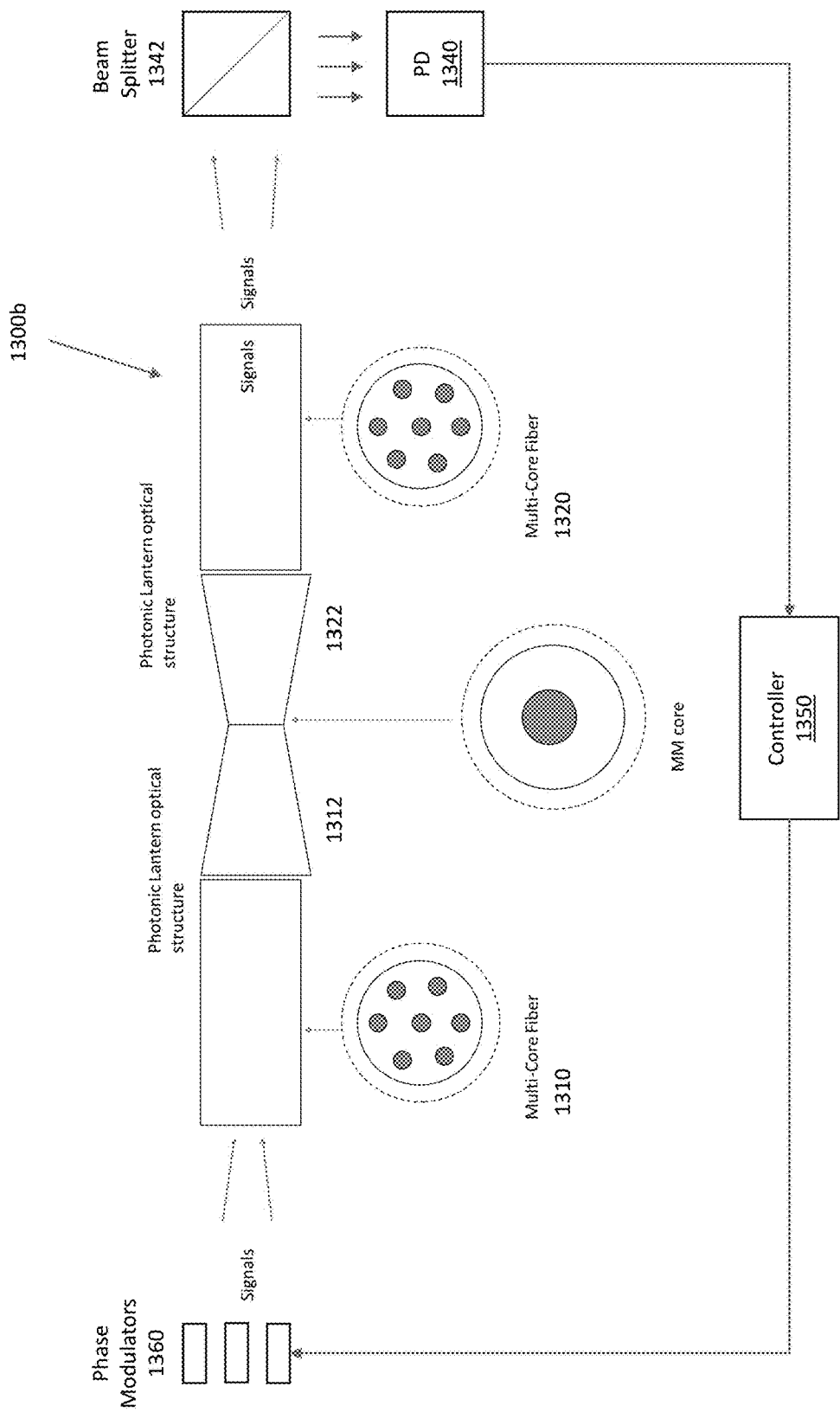

FIGS. 13A and 13B show photonic lanterns with multi-core inputs and outputs for switching modes between different cores.

Figure 14A:
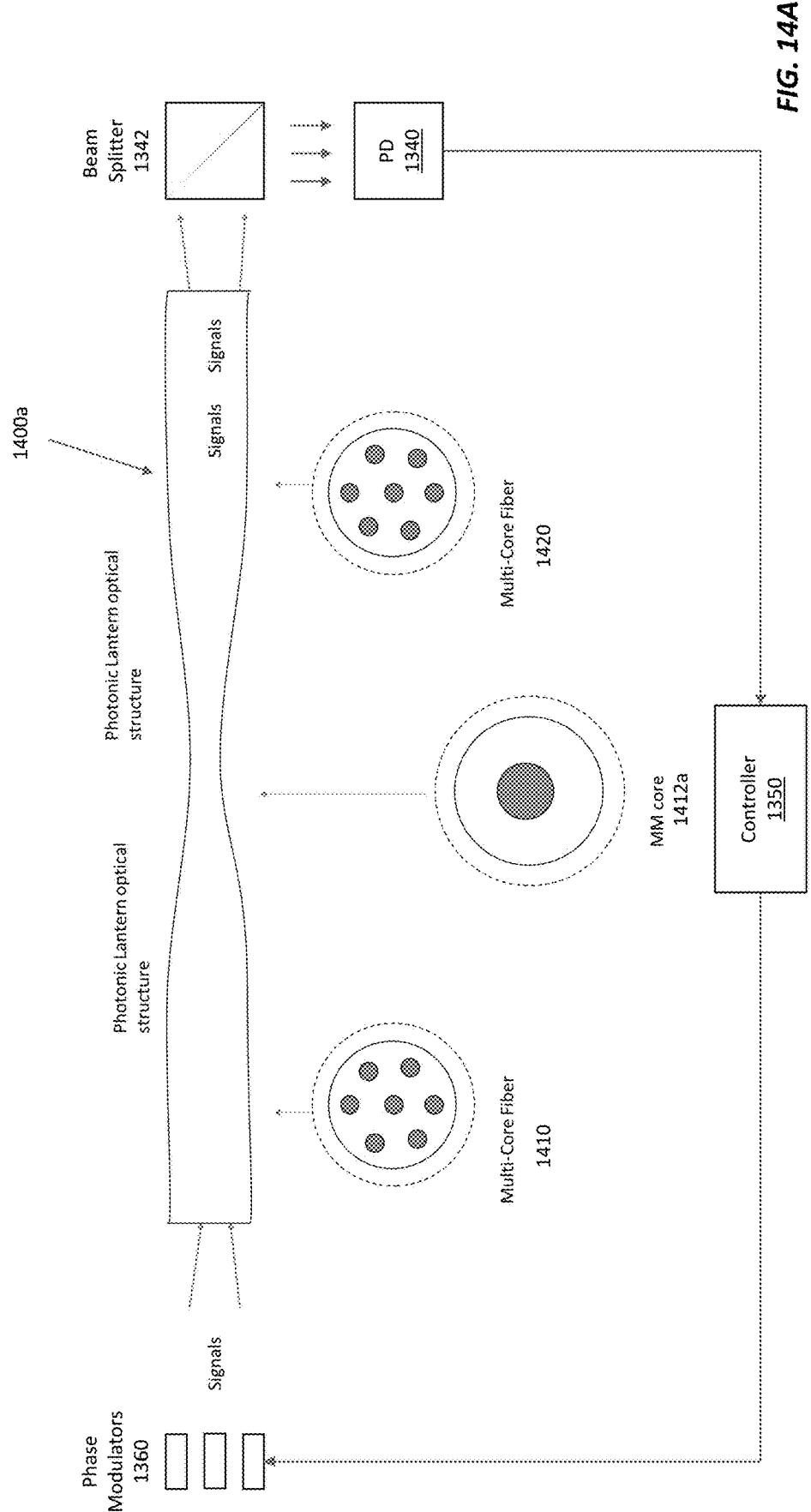
Figure 14B:
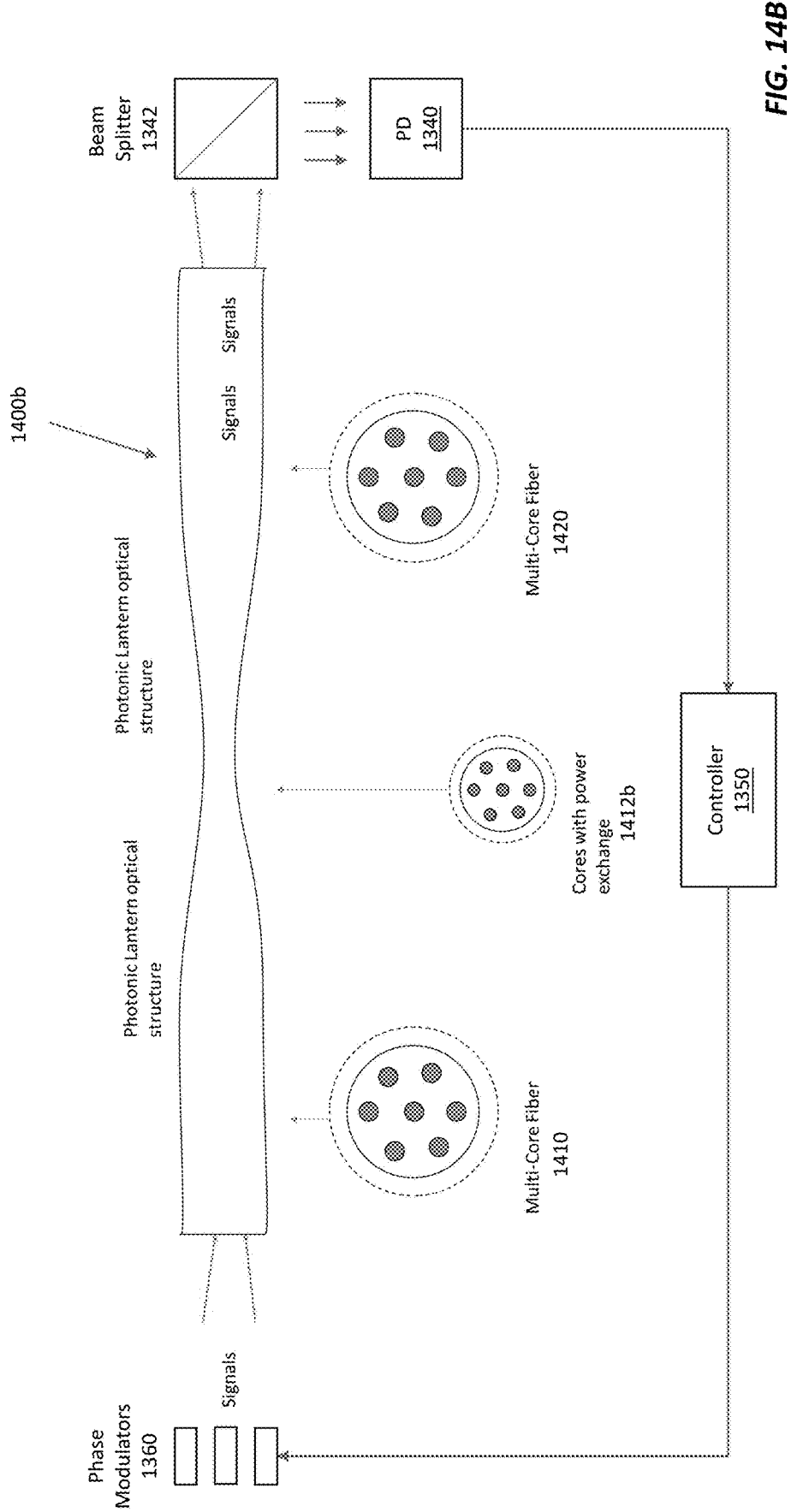

FIGS. 14A and 14B show integrated photonic lanterns with multi-core inputs and outputs for switching modes between different cores.

FIGS. 15A-15I show additional photonic lanterns.

DETAILED DESCRIPTION

In a photonic lantern, the output fiber may guide more modes or fewer modes than are coupled into the photonic lantern. In the "over-provisioned case," there are more input modes and polarizations than the output fiber can support. Over-provisioning may occur if the optical or control architecture uses extra degrees of freedom, the photonic lantern is not manufactured optimally, or there are losses for particular modes or other issues that require additional input control modes. In the "under-provisioned case," there are fewer input modes and polarizations (degrees of freedom) than the output fiber can support.

Under-provisioning may be acceptable for certain applications. For example, under-provisioning can be used to reduce the cost or complexity of a photonic lantern system by reducing the number of input channels and simplifying the associated optics and electronics. Under-provisioning may be acceptable when the merged (output) signal fiber suppresses higher-order modes and/or the energy transfer to higher-order modes, effectively reducing the number of degrees of freedom at the input (number of control channels).

Over-provisioning can be useful when imperfections in a practical system or manufacturing process cause the photonic lantern system to couple light into more spatial modes than originally anticipated. Over-provisioning the controlling channel count enables (greater) control of those extra modes.

Under-Provisioned Spatial Mode Control

Using an under-provisioned photonic lantern can reduce the complexity of a spatial mode control system (laser/amplifier) that controls the beam quality of the photonic lantern's output and the efficiency with power from the input modes is transferred to the output mode(s). In an under-provisioned photonic lantern, the fundamental output mode(s) can be excited and spatial mode controlled with little to no energy leakage over the length of the fiber to higher-order modes where little to no spatial modal control exists. This can reduce system complexity while allowing the use of large mode count (more highly multi-mode) fibers than would otherwise be practical. Further, the output mode of such a system can be set to the fundamental mode or an arbitrary combination of controllable modes without significant loss. As a result, the numerical aperture (NA) and/or mode field diameter (MFD) of the output fiber could be larger, with lower intensity (compared to fibers supporting fewer modes), allowing higher power scaling before the onset of optical nonlinearities, such as SBS, stimulated Raman scattering (SRS), four-wave mixing (FWM), and MMI. The output fiber (core) could be either passive or active.

Figure 4:
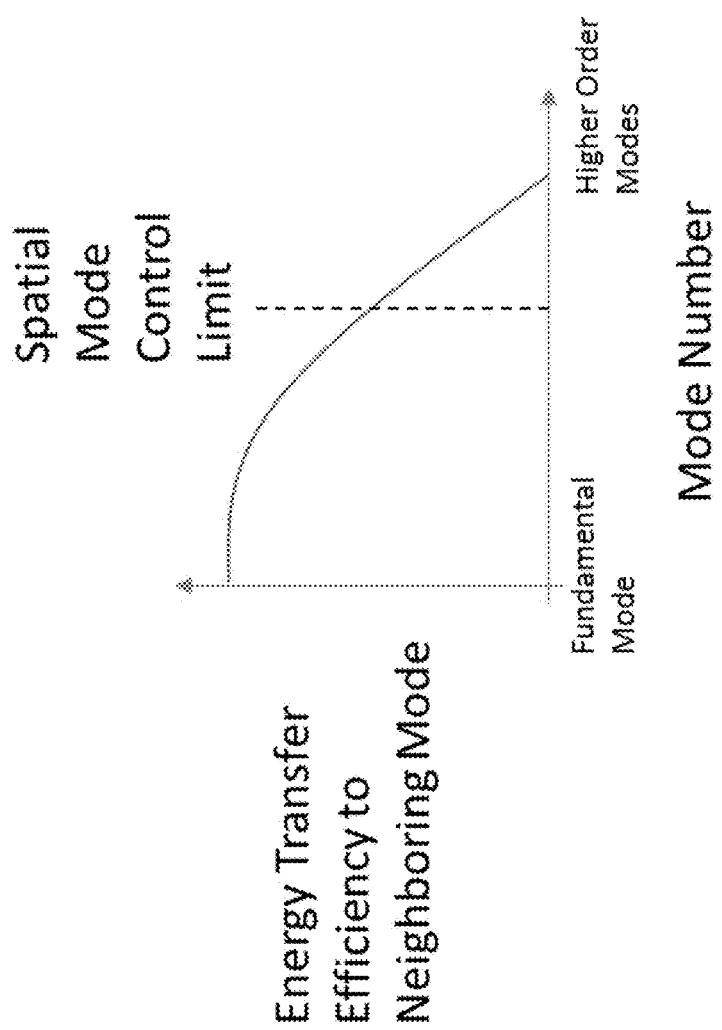
FIG. 4 is a plot of energy transfer efficiency vs. mode order for the photonic lantern of FIG. 3B.

FIG. 4 is a plot showing notional energy transfer versus mode number for spatial mode control of the inputs and output(s) of a photonic lantern. The curve plotted in FIG. 4 represents how efficient it is to transfer energy from one spatial mode to neighboring modes. The left side of the plot indicates the efficiency of transferring energy from the fundamental spatial mode to the nearest higher-order spatial modes (e.g., the LP11 spatial mode). The right side of the plot represents the decrease in efficiency when transferring energy between higher-order spatial modes, e.g., the LP33 and LP34 spatial modes.

A notional spatial mode control limit (vertical dashed limit) indicates the number of modes that can be controlled. This control limit may be set by the number of input channels or the number of degrees of freedom for controlling the input channels. In this case, the photonic lantern and control system can control the lower-order modes, where energy is readily transferred between neighboring modes, but may not control higher-order modes. This lack of control for higher-order modes may be acceptable because energy transfer to those higher-order modes is less efficient (suppressed), keeping the majority of the optical intensity in the desired controllable mode(s).

Figure 5C:
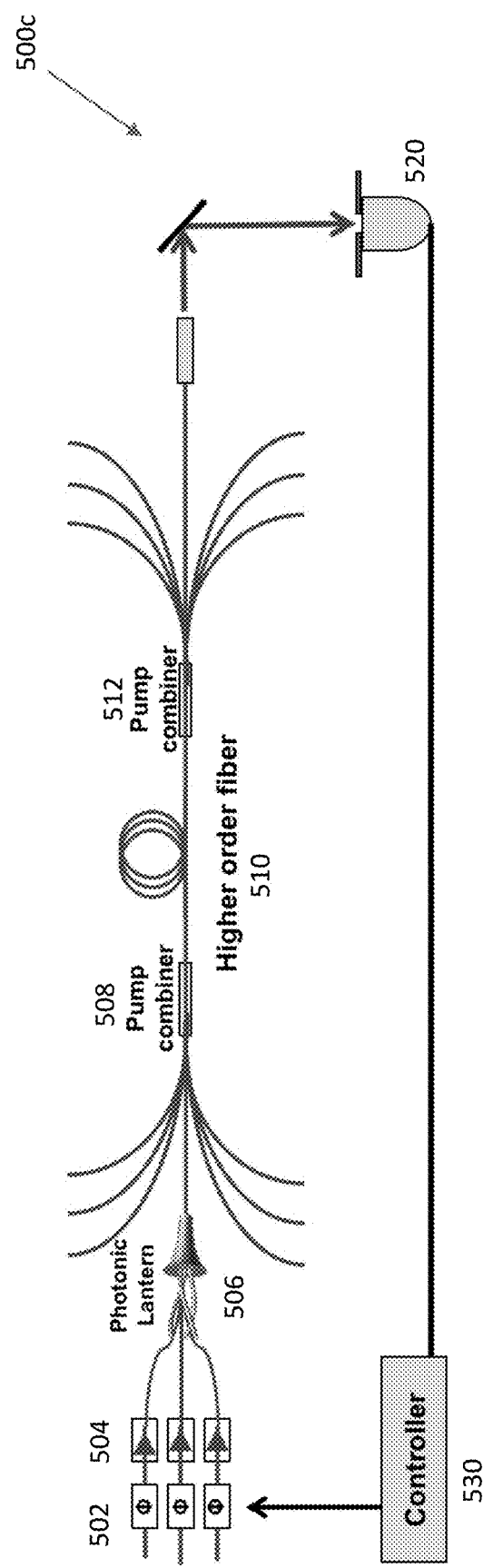

FIGS. 5A-5C show photonic lantern systems 500a-500c, respectively, with control systems for controlling the output spatial mode(s). The system 500a in FIG. 5A includes a photonic lantern 506 with three inputs, each of which is modulated by a corresponding a phase modulator 502 and amplified by a corresponding optical amplifier 504. For systems that use polarization for multiplexing, there may also be polarization controllers at each input to control the polarization(s) of the inputs.

A pump combiner 508 couples co-propagating pump light into a double-clad, higher-order doped optical fiber 510 that amplifies the output from the photonic lantern 506. (The system 500b in FIG. 5B uses a counter-propagating pump beams coupled into the doped optical fiber 510 with another pump combiner 512, and the system 500c in FIG. 5C uses both pump combiners 508 and 512 to coupled co- and counter-propagating pump beams into the doped optical fiber 510.)

A photodetector 520 detects a portion of the power in the fundamental mode(s) emitted by the optical fiber 510. A controller 530 coupled to the photodetector 520 modulates the phases of the inputs using the phase modulators 502 in order to increase or maximize the power detected by the photodetector 520. For systems with polarization controllers, the controller 530 may also modulate the polarizations of the input beams based on the power sensed by the photodetector 520. This increase in detected power generally corresponds to an increase in beam quality factor, as the power is more efficiently transferred to the fundamental mode(s). Appropriately configured versions of the photodetector 520 and controller 530 shown in FIGS. 5A-5C can be used with any of the photonic lanterns disclosed here.

If the photodetector 520 has multiple pixels or detector elements, it may sense the power distribution (e.g., power in different modes or cores) at the system output. In these cases, the controller 530 may modulate the phases and/or polarizations of the inputs to produce a desired power distribution (e.g., switching light or optical power from one spatial mode to another).

Over-Provisioned Spatial Mode Control

As mentioned above, an over-provisioned photonic lantern has more input modes/polarizations than supported output modes/polarizations. This compensates for defects in photonic lantern manufacturing as well as situations where equal provisioning of input and output modes/polarizations does not offer a high yield, long-term reliability, or long-term performance. Photonic lantern manufacturing defect include concentricity and offset misalignment when coupling the input fibers to the output fiber. In addition, aging of output/downstream fibers (e.g., photo darkening in active fibers) can make it harder to suppress higher-order modes by coiling the output fiber. This difficulty in suppressing higher-order modes in older photonic lanterns can lead to an undesired increase in the transfer efficiency of optical power from lower-order modes to higher-order modes.

Multi-Core Photonic Lanterns

FIGS. 6A-6C illustrate multi-core fibers for photonic lanterns. Photonic lanterns with multi-core input and/or output fibers can be more compact than other photonic lanterns as well as compatible with passive and active multi-core components. In FIG. 6A, a photonic lantern 600a couples a total of two polarizations from an input fiber 610a with two orthogonally oriented PM cores into a single SM output fiber 610b. In FIG. 6B, a photonic lantern 600b couples up to seven spatial modes from a multi-core input fiber 610b with seven SM cores into a single MM output fiber 620b. This MM output fiber 620b may support fewer than seven spatial modes, exactly seven spatial modes, or more than seven spatial modes as explained above with respect to over- and under-provisioning. A photonic lantern can be made with other multi-core input fibers, including those with more than two PM cores, fewer or more than seven SM cores, or even MM cores as shown in FIG. 6C.

The PM fiber cores in FIGS. 6A and 6C have stress rods 690a, 690b, and 690c (collectively, stress rods 690) whose orientations set the slow and fast axes of the PM fiber cores. These stress rods 690 can be aligned so that the slow and fast axes of the PM fiber cores are aligned with each other, as in FIG. 6C, or orthogonal to each other, as in FIG. 6A. Other orientations of the stress rods (and fast and slow axes) can also be used, including orientations where the fast axes of different PM fiber cores in the same multi-core fiber are at angles of 15°, 30°, 45°, or any other suitable angle.

Figure 7A:
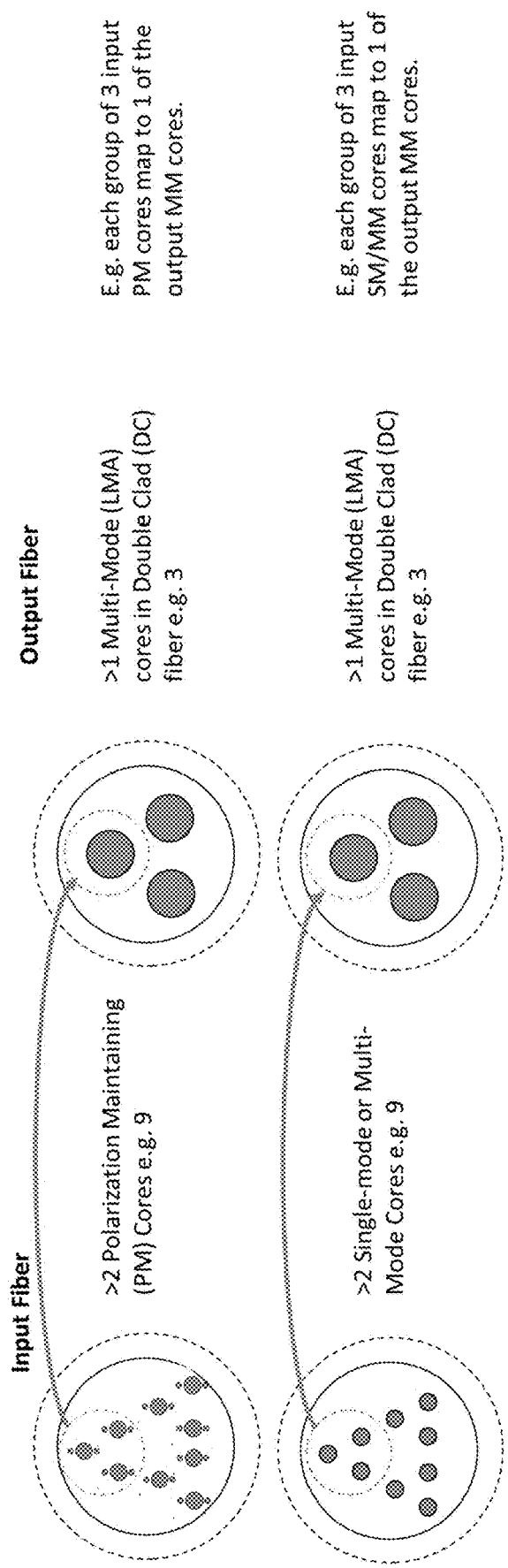
FIGS. 7A-7C illustrate mappings from different inputs to different outputs for photonic lanterns.
Figure 7B:
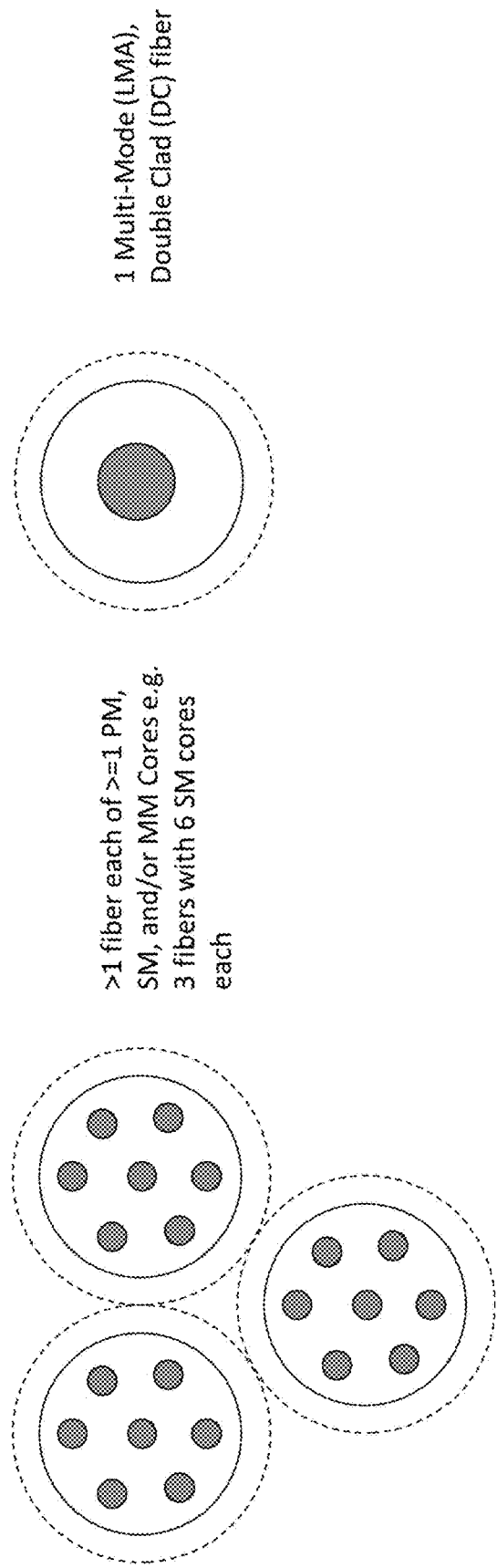
Figure 7C:
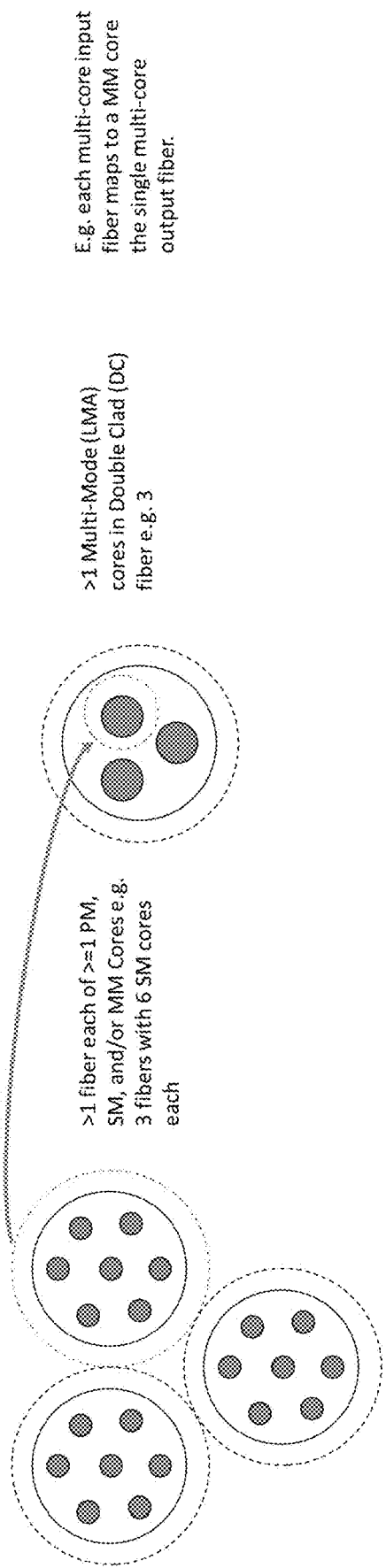

FIGS. 7A-7C show alternative arrangements of multi-core fibers for photonic lanterns. In FIG. 7A, the cores in a multi-core input fiber map to MM cores in a multi-core output fiber, with three PM or SM input cores (left) mapping to a corresponding MM LMA output core (right). IN FIG. 7B, the cores in several multi-core input fibers couple light into the core of a single-core MM LMA fiber. And in FIG. 7C, there are several multi-core input fibers, each of which maps to a corresponding MM LMA core in a multi-core output fiber, with seven input cores mapping to each output core. Other ratios of input cores to output cores are also possible, depending on the number of modes at the input, the number of modes at the output, and the provisioning of the photonic lantern.

Hybrid Pump-Signal Combiner/Photonic Lanterns

A monolithic, hybrid pump and signal combiner and photonic lantern combines the functions of a separate combiner and a separate photonic lantern with fewer manufacturing steps and splices. Advantages of such a monolithic combiner/photonic lantern include smaller size, lower weight, lower manufacturing cost, and lower insertion loss for the signal and/or pump beams due to fewer components and splices. In addition, a monolithic combiner/photonic lantern can be designed conserve pump brightness better than a separate combiner and a separate photonic lantern.

FIG. 8A shows an example combiner/photonic lantern 800. It includes two PM input fibers 810, each of which guides a single polarization; at least one input pump fiber 812; a double-clad, SM output fiber 820, which may be doped with a rare-earth ion; and a photonic lantern 830 that connects the PM input fibers 810 to the SM output fiber 820. In operation, the PM input fibers 810 couple orthogonally polarized signal beams 801 into different modes of the core of the SM output fiber 820 and the input pump fiber 812 couples a co-propagating pump beam 802 into the inner cladding of the SM output fiber 820. The pump beam 802 cross the core of the SM output fiber 820, amplifying the signal beams 801.

Many permutations of input signal and pump fibers and their arrangement (packing into the photonic lantern structure) are possible. To start, a combiner/photonic lantern can have more inputs and/or inputs in different arrangements than the arrangement shown in FIG. 8A. For instance, a combiner/photonic lantern may have multiple SM input fibers 810 and multiple input pump fibers 812 as shown at left in FIG. 8B, with the signal and pump beams coupled into the core and inner cladding, respectively, of a MM double-clad output fiber as shown at right in FIG. 8B. The output fiber could be photonic structured, passive, or active (e.g., doped with Er, Yb, or Tm for amplifying the signal beam).

FIGS. 9A-9C show hybrid combiner/photonic lanterns 900a-900c whose output fibers have non-circular cross sections, which are used in active doped fibers to encourage pump light mixing/core-crossing for more efficient pump absorption in the core. The combiner/photonic lantern 900a in FIG. 9A has two PM input fibers 910 that couple signal light into the core of an active output fiber 920. It also has a pump fiber 912a that guides pump light. The pump fiber 912a is integrated into a photonic lantern 930a that joins the input fibers 910 together and is melted to the output fiber 920. Melting the pump fiber 912a to the output fiber 920 allows pump light to pass from the core of the pump fiber 912a through the core and cladding of the output fiber 920 as shown by the arrows in the cross-sections at lower right in FIGS. 9A-9C. In the combiner/photonic lantern 900b in FIG. 9B, the pump fiber 922b is not part of the photonic lantern 930b but is melted to the output fiber 920. And the combiner/photonic lantern 900c in FIG. 9C includes both a first pump fiber 912c melted or tapered into the photonic lantern 930c and a second pump fiber 922c that is melted to the output fiber 920.

FIGS. 10A-10C show arrangements of pump fibers and multi-core input fibers for different hybrid combiner/photonic lanterns. Signal light from different cores in a single multi-core fiber can coupled into the core of a single double-clad, multi-mode output fiber, with co-propagating pump light from one or more pump fibers coupled into the inner cladding of the double-clad output fiber as in FIG. 10A. Alternatively, signal light from different multi-core fibers can coupled into the core of a single double-clad output fiber, with co-propagating pump light from one or more pump fibers coupled into the inner cladding of the double-clad output fiber as in FIG. 10B. Or signal light from different multi-core fibers can coupled into respective cores of a single multi-core, double-clad output fiber, with pump light from one or more pump fibers coupled into the inner cladding of the double-clad output fiber as in FIG. 10C.

The signal and pump beams can also propagate in opposite directions. As shown in FIG. 11, for example, a hybrid combiner/photonic lantern 1100 couples signal light from a multi-core input fiber 1110 into the core of a multi-mode output fiber 1120. (The signal light propagates from left to right as shown by the arrows in FIG. 11.) At the same time, pump fibers 1122 couple counter-propagating pump light into the cladding of the multi-core input fiber 1110. (The pump light propagates from right to left as shown by the arrows in FIG. 11.)

Multi-Core Photonic Lanterns with Cladding Mode Strippers

It is often useful to strip out cladding light (typically residual pump light, but also a portion of signal light that is unwanted) from an optical fiber in a known, thermally managed location/region to prevent optical or thermal damage to upstream or downstream components. For example, the photonic lanterns with active input or output fibers may guide significant amounts of cladding light. Cladding strippers on or more parts of the photonic lantern can remove this excess cladding light to prevent damage to upstream and downstream components. These cladding strippers may include surface irregularities that scatter cladding light out of the photonic lantern, higher-index material that couples light out of the photonic lantern, or a combination of surface irregularities and higher-index material.

FIGS. 12A-12E show photonic lantern systems 1200a-1200e with multi-core input fibers and different cladding strippers. The photonic lantern system 1200a in FIG. 12A has a cladding stripper 1202 comprised of surface irregularities 1202 that can formed by chemically, mechanically, or optically etching the outer surface of the input fiber's cladding or by depositing material on the outer surface of the input fiber's cladding. The surface irregularities scatter cladding light out of the input at the optical-to-air/material interface through refraction and/or reflection. The photonic lantern systems 1200b and 1200c in FIGS. 12B and 12C have similar features 1204 and 1206 on the photonic lantern and output fiber, respectively. And in the photonic lantern system 1200d of FIG. 12D, there are surface irregularities 1202, 1204, and 1206 on the input fiber, photonic lantern, and output fiber. Alternatively, or in addition, the photonic lantern system 1200e is at least partially encapsulated by a block 1210 of glass or other material whose refractive index is higher than the refractive index of the photonic lantern's outer cladding. Light propagating in the outer cladding refracts into this block 1210 and out of the photonic lantern system 1200e.

Switching with Multi-Core Photonic Lanterns

As explained above, a multi-core photonic lantern couples the signals from multiple input cores into one or more output cores (e.g., a single multi-mode output core). By using this output core as the input to a photonic lantern with a multi-core output, the multi-core input signals can be distributed among the cores at the output. This could be used to route or switch power from a given input core to one or more output cores.

FIGS. 13A and 13B show multi-core photonic lantern switching systems 1300a and 1300b, respectively, that can be used to switch light from a given input core to a given output core. The system 1300a includes a multi-core input fiber 1310 coupled to a multi-mode fiber 1330 via a first photonic lantern 1312. The multi-mode fiber 1330a is coupled in turn to a multi-core output fiber 1320 via a second photonic lantern 1322. In the system 1300b of FIG. 13B, the first photonic lantern 1312 and second photonic lantern 1322 are coupled directly to each other at a multi-mode interface 1330b instead of to a multi-mode fiber.

The system 1300a also includes a beam splitter 1342, detector 1340, controller 1350, and phase modulators 1360 that can be used to switch light from the input cores among different output cores. In operation, the beam splitter 1342 directs a portion of the system's output to the detector 1340, which can be implemented as a detector array (e.g., a CCD or CMOS imager) or one a set of separate photodetectors, with one photodetector per output core. The detector 1340 senses the power (and optionally the profile) of the beam from each core of the multi-core output. The controller 1360 uses the power (and optionally the beam profile) information from the photodetector 1340 to adjust the phases of the input optical beams with the phase modulators 1360. By modulating the input phases appropriately, the controller 1360 can switch light from a given input core to a given output core. The exact phase modulation used for switching may be determined empirically and can be adjusted as appropriate to account for thermal drift and mechanical perturbations that shift light from one output to another output.

In FIGS. 13A and 13B, the number of input cores matches the number of modes supported by the multi-mode fiber 1330 and the number of output cores, but other arrangements are also possible, including more input cores than output cores and more output cores than input cores, so long as the number of modes supported by the multi-mode fiber 1330a in FIG. 13A or the multi-mode interface 1330b in FIG. 13B equals or exceeds the greater of the number of input cores and the number of output cores. In general, there should be N input cores, M≥N output cores, and L≥M≥N modes in the multi-mode fiber 1330a or interface 1330b to ensure that light from any input core can be switched to any output core, where L, M, and N are positive integers. To ensure bi-directional, reciprocal switching (i.e., the ability to couple light from any input core to any output core and vice versa), the numbers of cores and modes should be chosen such that L≥M=N. For other coupling arrangements, the photonic lantern system may switch fewer than all of the cores.

FIGS. 14A and 14B show tapered multi-core photonic lantern switching systems 1400a and 1400b. Like the systems 1300a and 1300b, they can switch or couple light from an input core to a given output core. Instead of being discrete formed of discrete components, the tapered multi-core photonic lantern switching systems 1400a and 1400b are formed from individual multi-core fibers that have been tapered, melted, twisted, and/or processed. Each system 1400a, 1400b has a multi-core input region 1410 and a multi-core output region 1420. In the first system 1400a, an intermediate region (fused photonic lantern) 1412a with a single multi-mode core connects the multi-core input region 1410 to the multi-core output region 1420. In the second system 1400b, an intermediate region (fused photonic lantern) 1412b with several evanescently coupled cores connects the multi-core input region 1410 to the multi-core output region 1420.

These intermediate regions 1412 can be formed by simultaneously drawing and heating a multi-core fiber. Drawing the fiber 1412a causes the cores to get smaller and closer together; once they are small enough and close enough together, as in FIG. 14B, light couples among the cores as it propagates from the input region 1410 to the output region 1420. Put differently, drawing reduces mode confinement of the cores of the multi-core fiber, causing power to be exchanged between the cores in the tapered region, e.g., because the cores are too small to support modal confinement and/or due to effervescent field overlap between cores. Continued drawing causes the cores to merge into a single multi-mode core in the taper/melt region due to thermal diffusion of dopants as in FIG. 14A.

Figure 15A:
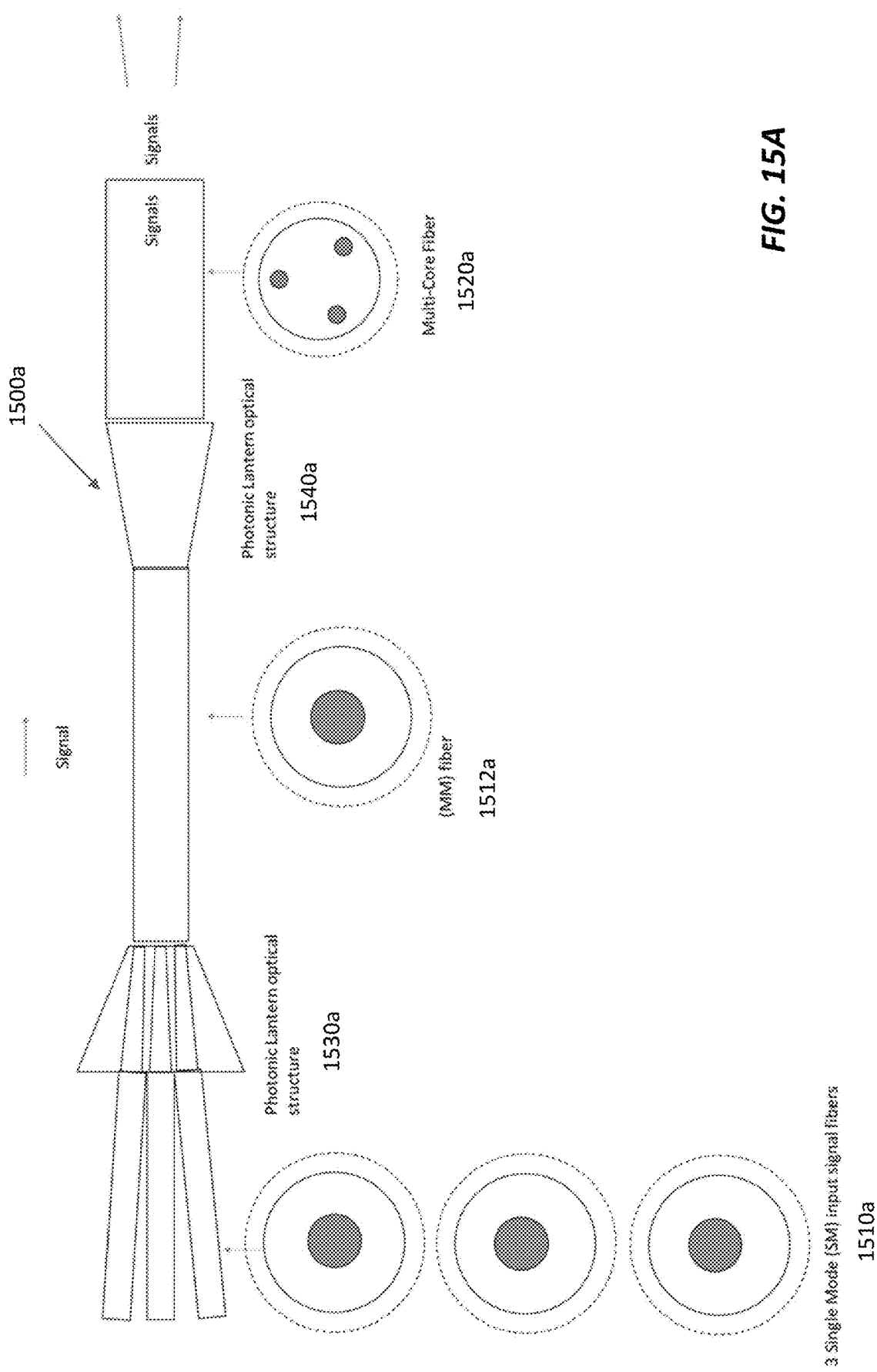
Figure 15B:
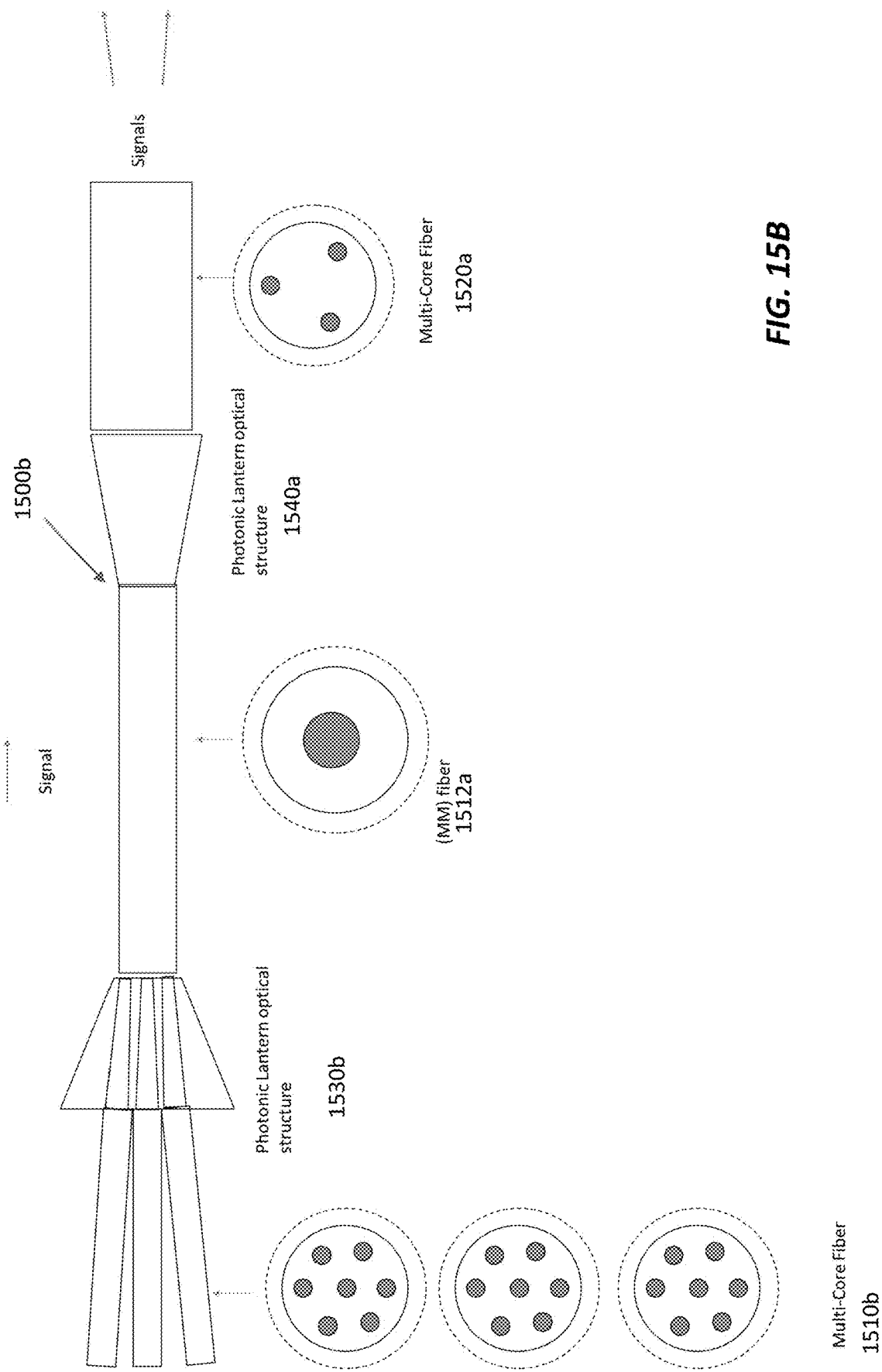
Figure 15C:
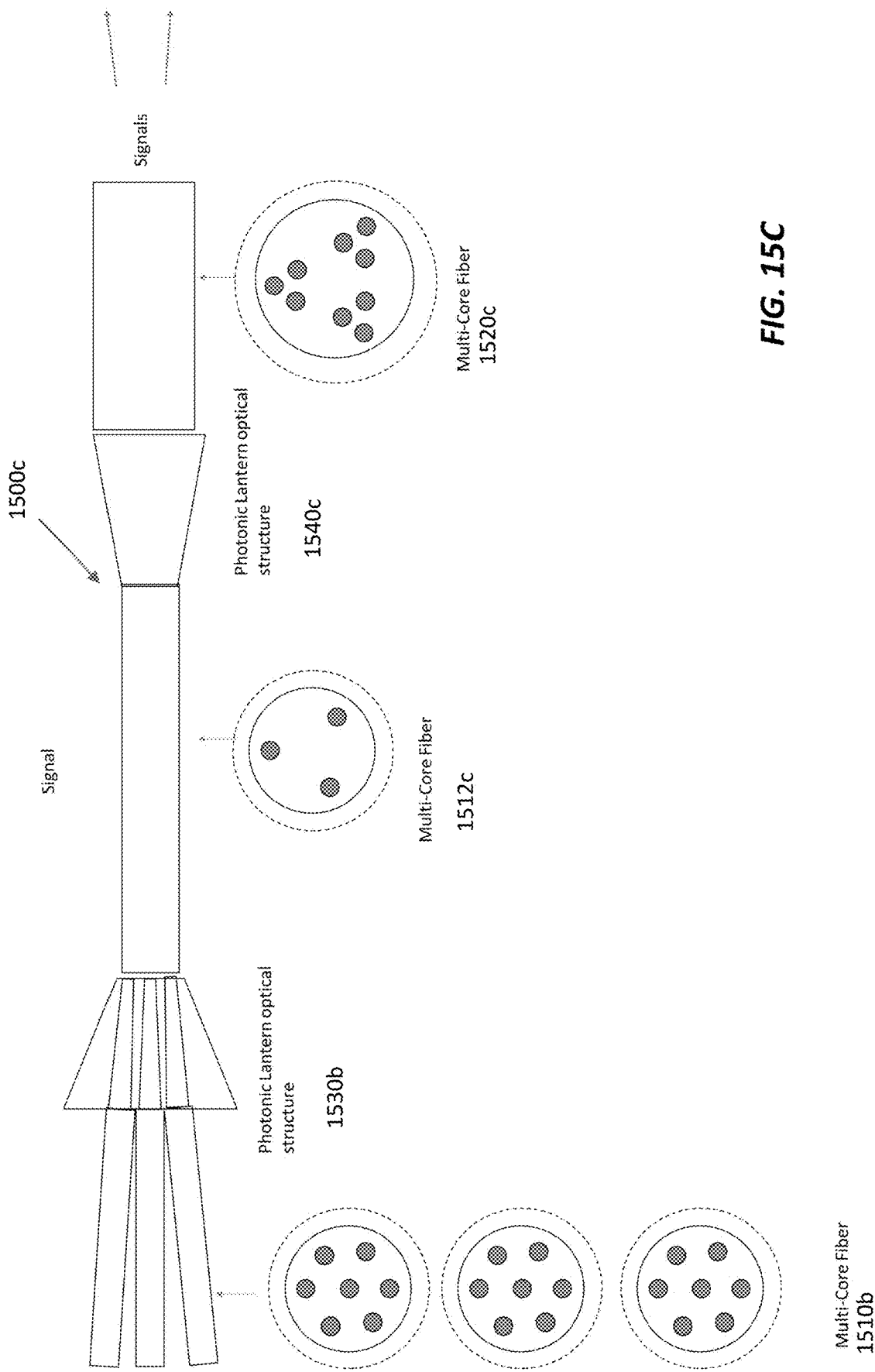

FIGS. 15A-15I show other systems with photonic lantern systems 1500a-1500i that couple light into and/or out of multi-core fibers. The photonic lantern system 1500a in FIG. 15A has three single-mode input fibers 1510a, each of which is coupled to a corresponding core of a three-core output fiber 1520a via a multi-mode intermediate fiber 1512a coupled between photonic lanterns 1530a and 1540a. The photonic lantern system 1500b in FIG. 15B is the same, except for the input fibers and first (input) photonic lantern 1530b: instead of single-mode input fibers 1510a, each input fiber 1510b has multiple cores. Light from each input core can be coupled into a given output core by phase-modulating the inputs as described above. The photonic lantern system 1500c of FIG. 15C has a three-core intermediate fiber 1512c coupled to a nine-core output fiber 1520c via a second photonic lantern 1540c.

Figure 15D:
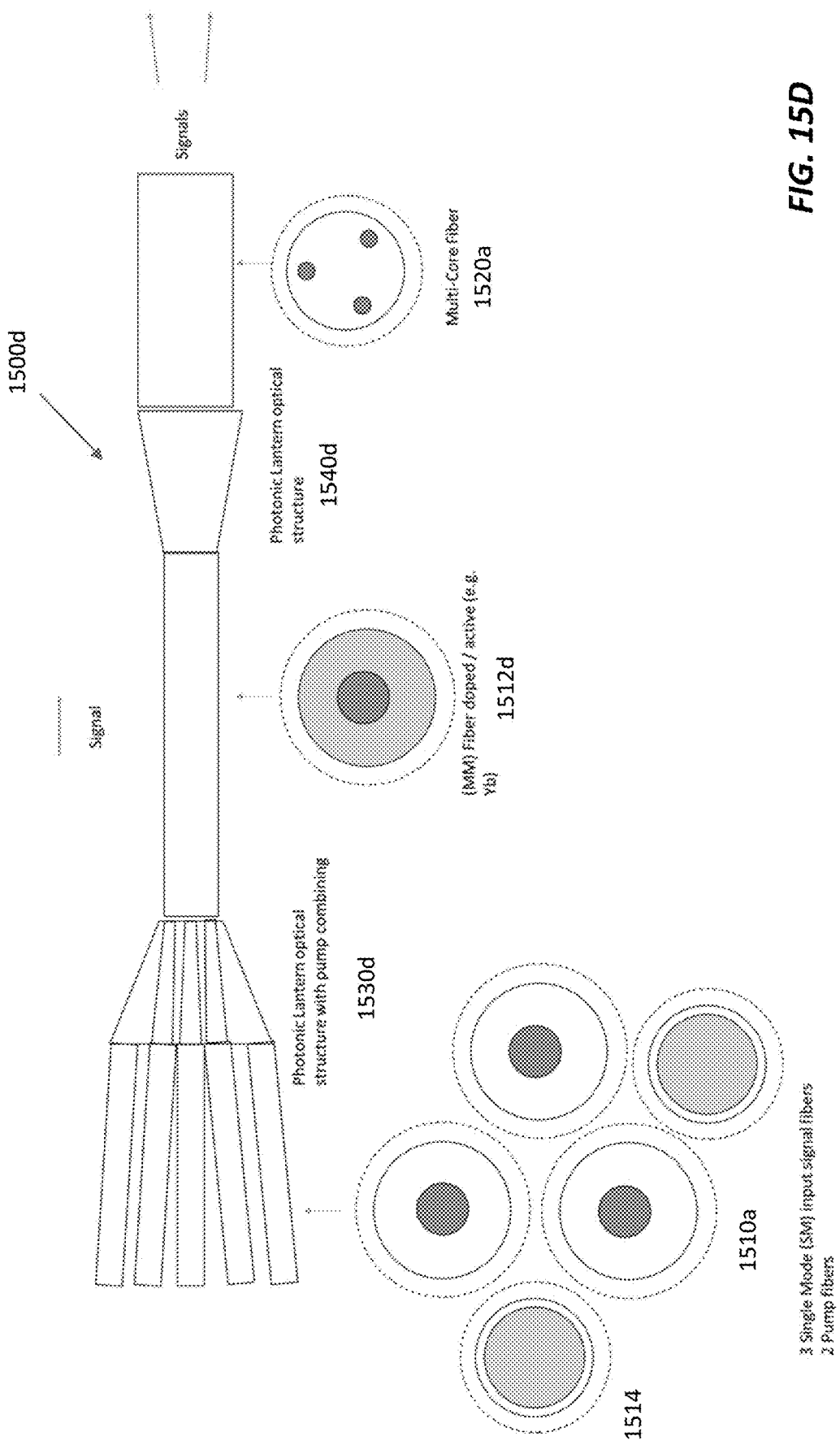

The photonic lantern system 1500d of FIG. 15D has input pump fibers 1514 in addition to single-mode input fibers 1512a coupled via a first photonic lantern 1530d to a double-clad, multi-mode intermediate fiber 1512d with a doped core that guides and amplifies signal light and an inner cladding that guides pump light. The intermediate fiber 1512d is coupled to a multi-core output fiber 1520a via a second photonic lantern 1540d.

Figure 15E:
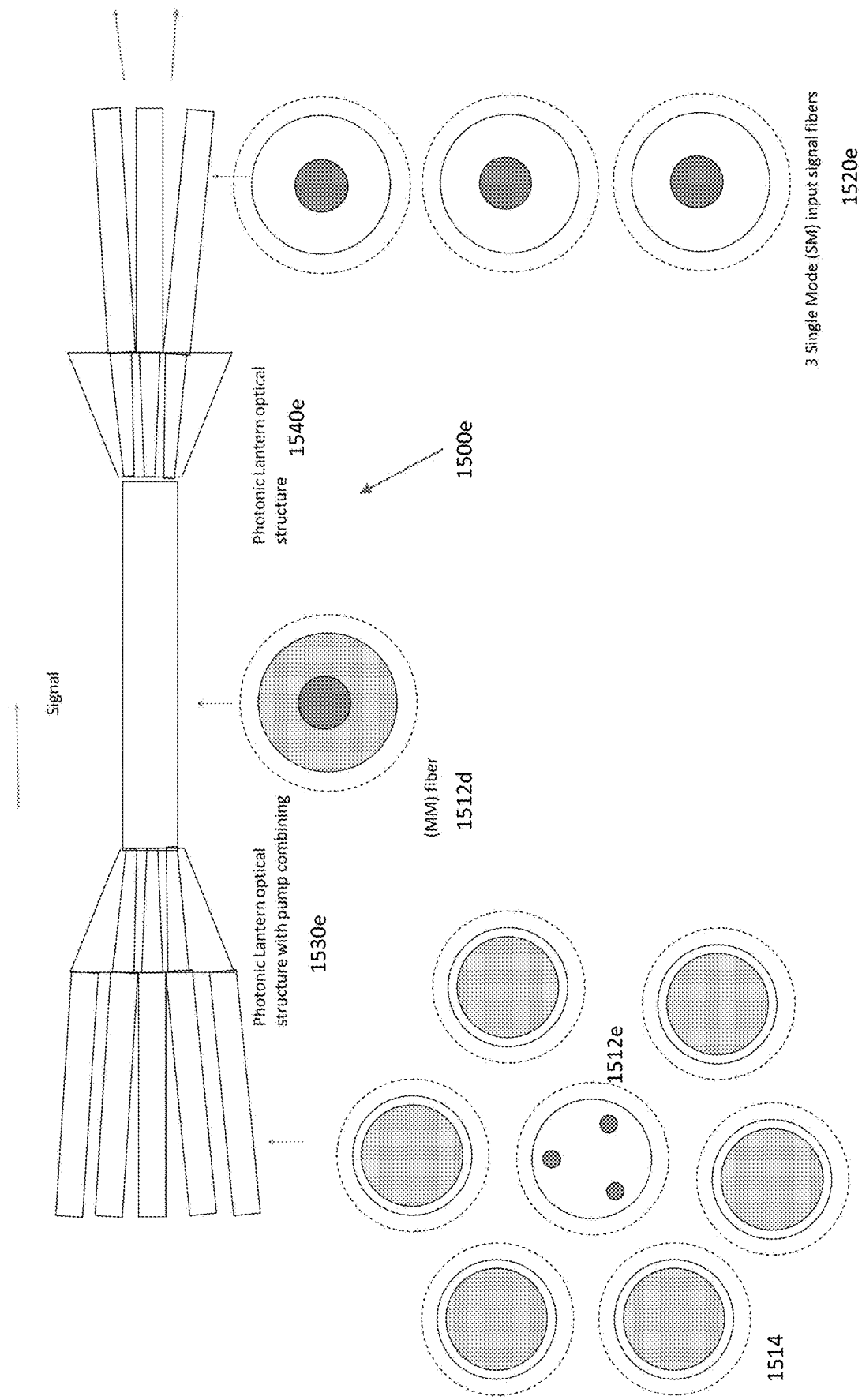

The photonic lantern system 1500e of FIG. 15E has input pump fibers 1514 and a multi-core input fiber 1512e coupled via a first photonic lantern 1530e to a double-clad, multi-mode intermediate fiber 1512d with a doped core that guides and amplifies signal light and an inner cladding that guides pump light. Each set of input cores is mapped to a specific core of the intermediate multi-core fiber 1512e; the intermediate cores are then mapped to single-mode output fibers 1520e via a second photonic lantern 1540e.

Figure 15F:
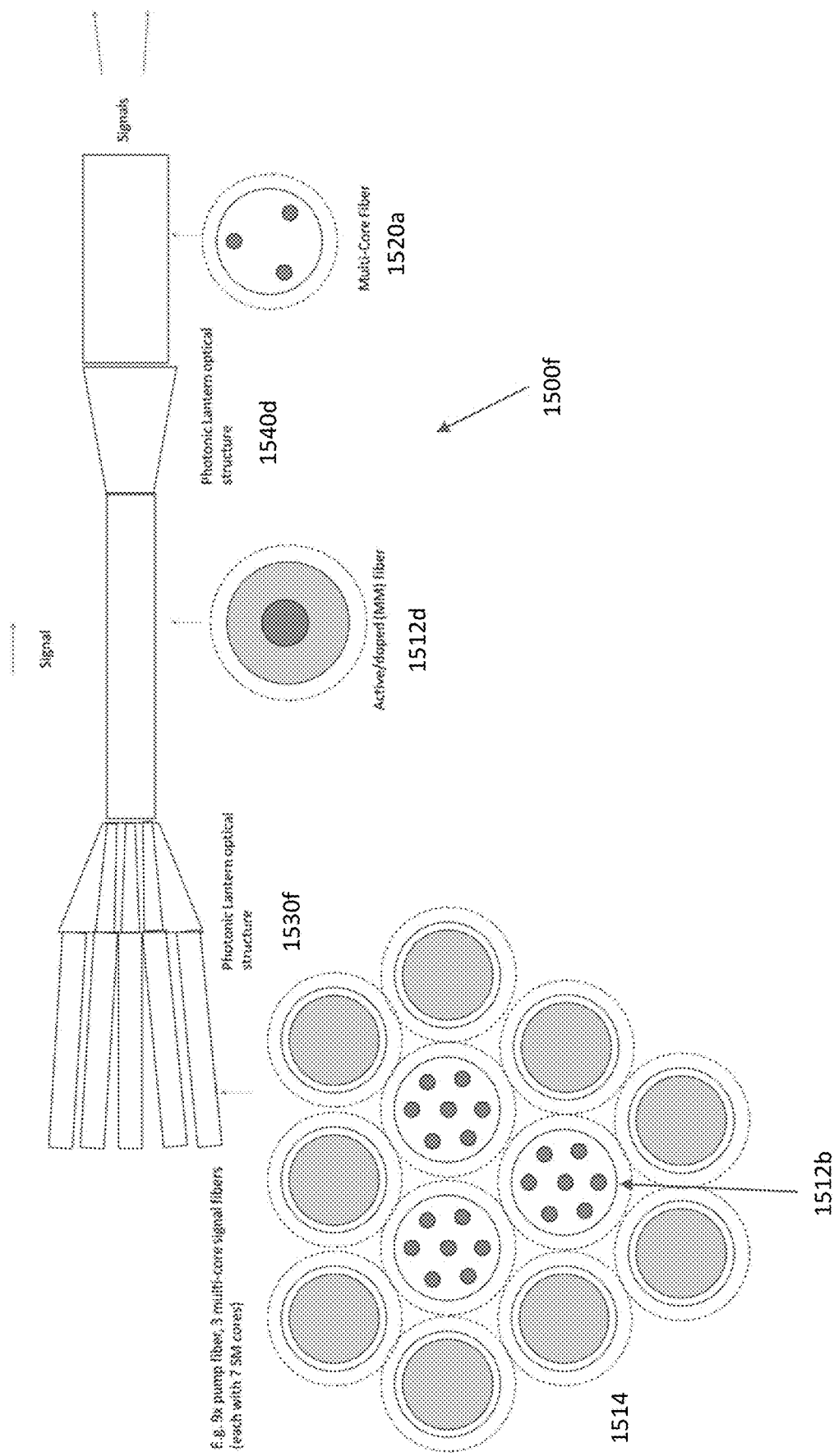
Figure 15G:
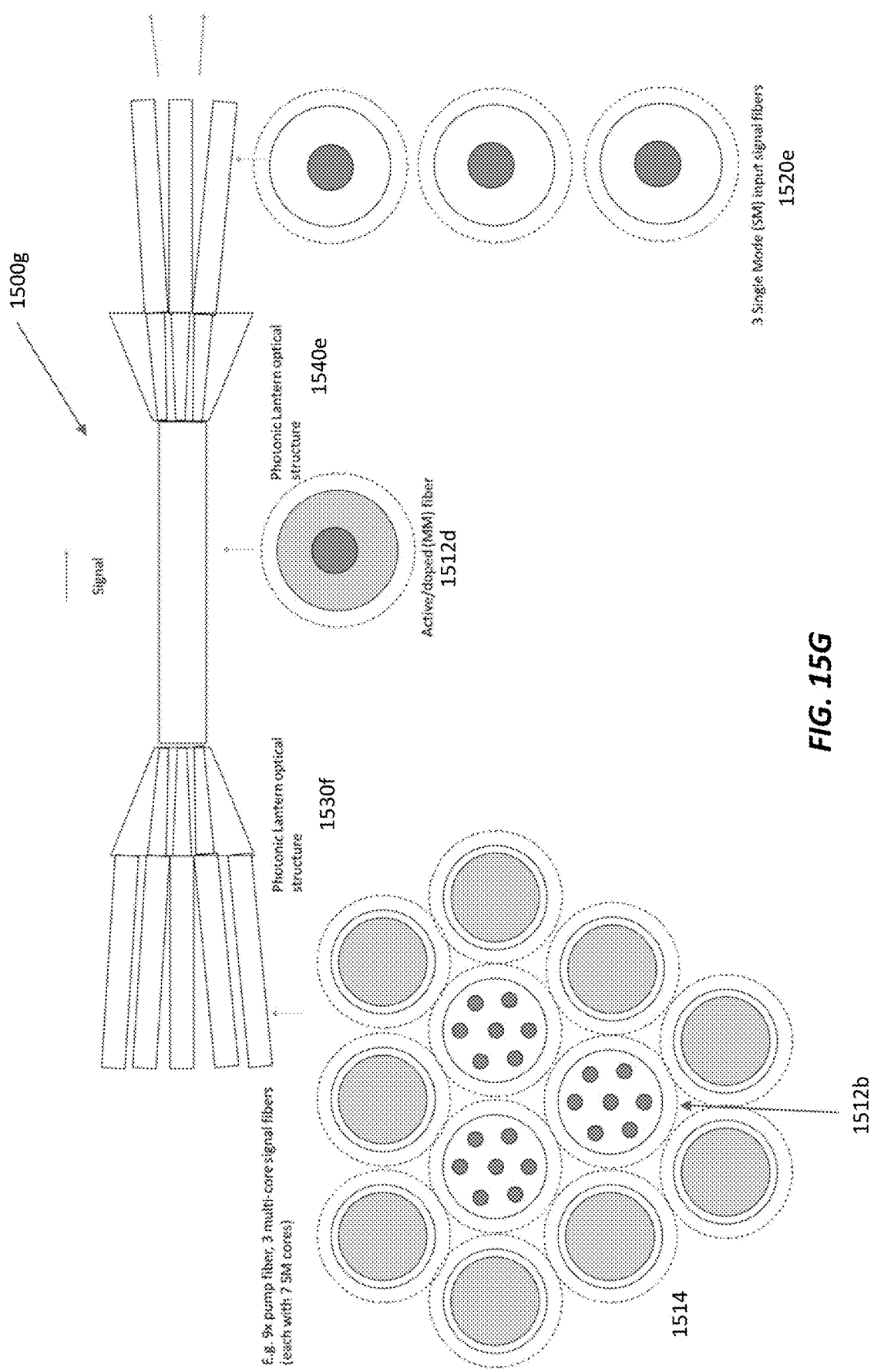

The photonic lantern system 1500f in FIG. 15F has multi-core input fibers 1510f and input pump fibers 1514 coupled to an active MM intermediate fiber 1512d via a first photonic lantern 1530e. The active MM intermediate fiber 1512d is coupled to a multi-core output fiber 1520a via a second photonic lantern 1540d. In the photonic lantern system 1500g of FIG. 15G, a second photonic lantern 1540e maps the modes of active/doped intermediate MM fiber to multiple single-core fibers 1520e.

Figure 15H:
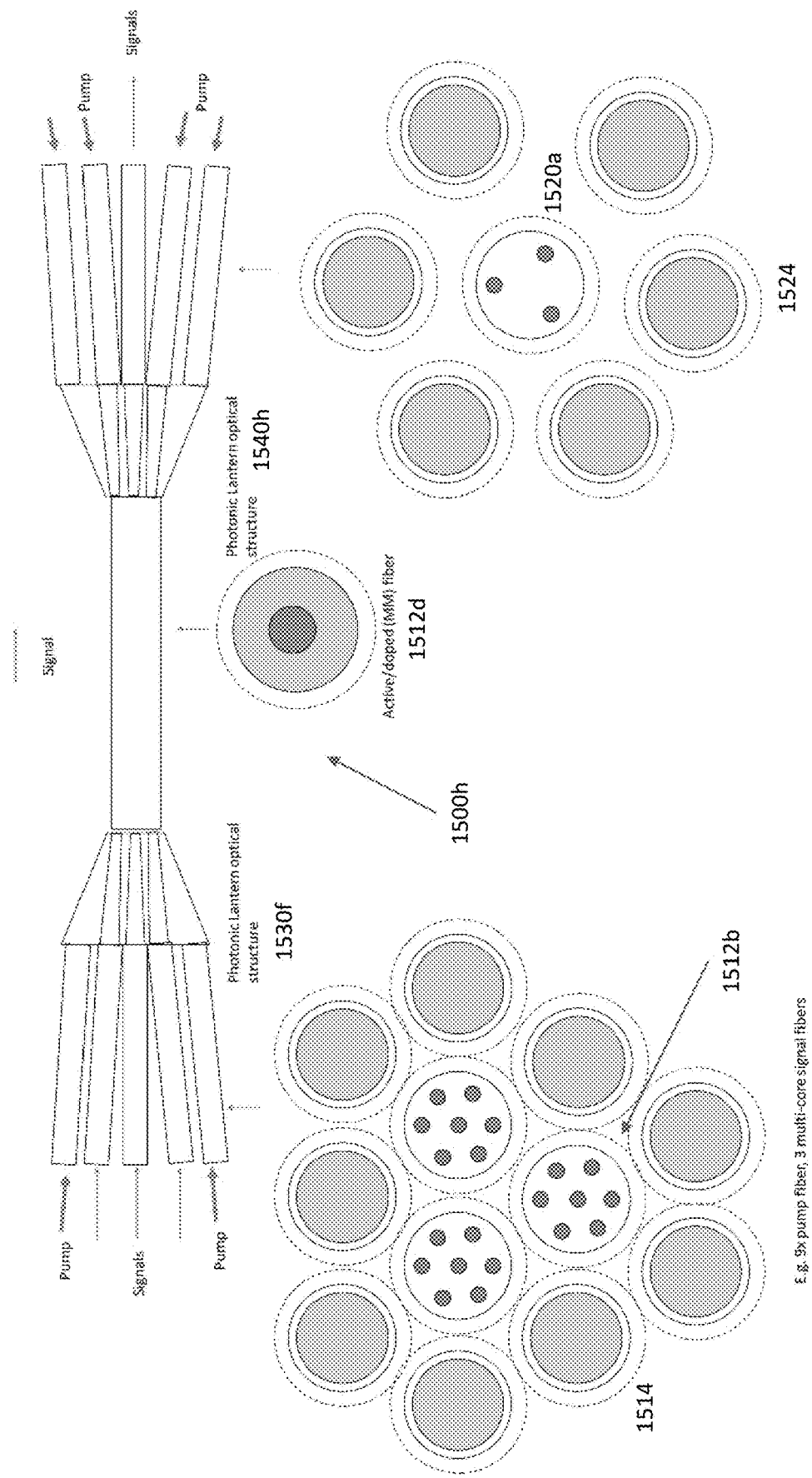
Figure 15I:
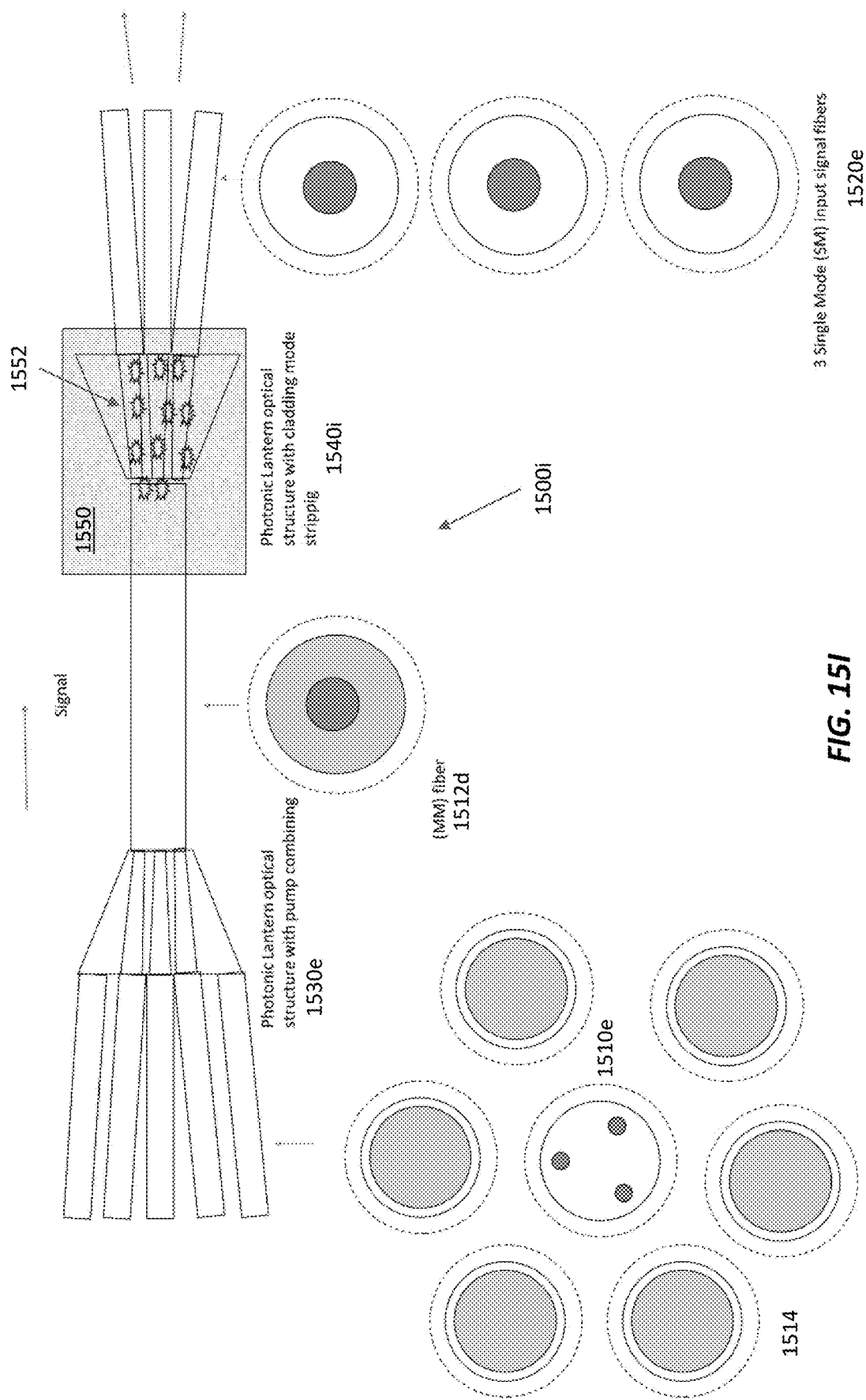

The photonic lantern system 1500h in FIG. 15H is bidirectionally pumped, with pump fibers 1524 coupling counter-propagating pump beams to the inner cladding of an active MM fiber 1512d via a second photonic lantern 1540h. And in the photonic lantern system 1500i in FIG. 15I, the second photonic lantern 1540i is encased in a block of high-index material 1550 and treated to have surface irregularities 1552 that couple stray pump light out of the cladding.

In each of the photonic lantern systems 1500a-1500i, the beams can be switched among the output cores or fibers by adjusting the phases of the beams guided by the input cores or fibers, e.g., using a beam splitter, photodetector, controller, and phase modulators as shown in FIG. 13A and described above. Likewise, each component in the photonic lantern systems 1500a-1500i may have surface irregularities or be encapsulated in high-index material to couple stray pump and signal light out of the cladding.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus comprising:
   a first multi-core optical fiber;
   a second multi-core optical fiber; and
   a coupler optically connecting the first multi-core optical fiber to the second multi-core optical fiber,
   wherein the first multi-core optical fiber comprises N cores and the second multi-core optical fiber comprises M<N cores, where M and N are positive integers.

2. The apparatus of claim 1, wherein the first multi-core optical fiber comprises a plurality of polarization-maintaining (PM) cores.

3. The apparatus of claim 1, wherein each of the M<N cores is a multi-mode core.

4. The apparatus of claim 1, wherein the coupler is a first coupler coupled to the first multi-core optical fiber and further comprising:
   a second coupler coupled to the second multi-core optical fiber; and
   an intermediate optical fiber connecting the first coupler to the second coupler.

5. The apparatus of claim 4, wherein the intermediate optical fiber is doped with a gain medium.

6. The apparatus of claim 4, wherein the intermediate optical fiber is a third multi-core optical fiber.

7. The apparatus of claim 4, wherein the intermediate optical fiber has a cladding configured to guide a pump beam.

8. The apparatus of claim 1, further comprising:
   at least one pump fiber, evanescently coupled to the first multi-core optical fiber, to guide a pump beam amplifying a signal beam propagating in the first multi-core optical fiber, and
   wherein the second multi-core optical fiber has a cladding configured to guide the pump beam.

9. The apparatus of claim 1, wherein at least one of the first multi-core optical fiber, the second multi-core optical fiber, or the coupler has a surface configured to scatter light.

10. The apparatus of claim 1, wherein at least one of the first multi-core optical fiber, the second multi-core optical fiber, or the coupler is embedded in a material configured to couple light out of the first multi-core optical fiber, the second multi-core optical fiber, or the coupler.

11. An apparatus comprising:
    a first multi-core optical fiber;
    a second multi-core optical fiber; and
    a coupler optically connecting the first multi-core optical fiber to the second multi-core optical fiber,
    wherein the first multi-core optical fiber comprises N cores and the second multi-core optical fiber comprises M>N cores, where M and N are positive integers.

12. The apparatus of claim 11, wherein the first multi-core optical fiber comprises a plurality of polarization-maintaining (PM) cores.

13. An apparatus comprising:
    a first multi-core optical fiber;
    a second multi-core optical fiber;
    a first coupler optically connecting the first multi-core optical fiber to the second multi-core optical fiber;
    a second coupler coupled to the second multi-core optical fiber; and
    an intermediate optical fiber connecting the first coupler to the second coupler,
    wherein the intermediate optical fiber is a multi-mode optical fiber.

14. The apparatus of claim 13, wherein the first multi-core optical fiber comprises a plurality of polarization-maintaining (PM) cores.

15. An apparatus comprising:
    a multi-core input fiber;
    a multi-core output fiber;
    at least one coupler, optically connecting the multi-core input fiber to the multi-core output fiber, to couple a first beam from a first input core into the multi-core input fiber to a first output core in the multi-core output fiber; and
    a detector, in optical communication with the multi-core output fiber, to sense light emitted by the first output core;
    a controller, operably coupled to the detector, to determine a phase adjustment to the first beam, the phase adjustment causing the at least one coupler to couple the first beam from the first input core to a second output core in the multi-core output fiber; and
    a phase modulator, in optical communication with the first input core, to impart the phase adjustment to the first beam.

16. The apparatus of claim 15, wherein the multi-core input fiber has N cores and the multi-core output fiber has N cores, where N is a positive integer.

17. The apparatus of claim 16, wherein the at least one coupler has a multi-mode region configured to support M≥N modes, where M is a positive integer.

18. The apparatus of claim 16, wherein the at least one coupler has at least M≥N evanescently coupled cores, where M is a positive integer.

19. The apparatus of claim 16, wherein the at least one coupler comprises a first coupler and a second coupler, and further comprising:
- an active fiber connecting the first coupler to the second coupler; and
- at least one input pump fiber, in optical communication with the active fiber via the first coupler, to couple a pump beam into an inner cladding of the active fiber.

* * * * *